United States Patent [19]

Inoue et al.

[11] Patent Number: 4,763,104

[45] Date of Patent: Aug. 9, 1988

[54] GATEWAY FOR USE IN LOAD CONTROL SYSTEM

[75] Inventors: Masahiro Inoue; Ricko Yoshikawa; Yoshiji Minagawa; Noriyuki Kushiro, all of Kanagawa, Japan

[73] Assignee: Mitsubishi Denki Kabushiki Kaisha, Tokyo, Japan

[21] Appl. No.: 27,221

[22] Filed: Mar. 17, 1987

[30] Foreign Application Priority Data

| Mar. 19, 1986 [JP] | Japan | 61-61487 |
| Mar. 20, 1986 [JP] | Japan | 61-62658 |
| Mar. 20, 1986 [JP] | Japan | 61-62659 |
| Mar. 20, 1986 [JP] | Japan | 61-62660 |

[51] Int. Cl.$^4$ .......................................... H04M 11/04
[52] U.S. Cl. ........................ 340/310 R; 340/310 A; 340/538; 340/825.03; 340/827; 375/37; 379/221; 333/14
[58] Field of Search ........ 340/310 R, 310 A, 310 CP, 340/531, 538, 825.03, 825.04, 825.06–825.13, 825.21, 825.29, 825.52, 825.54, 827; 375/36, 37; 333/3, 14, 100, 101, 109; 379/219–221, 229, 240, 399

[56] References Cited

U.S. PATENT DOCUMENTS

| 4,114,150 | 9/1978 | Yamazaki et al. | 340/310 R |
| 4,470,093 | 9/1984 | Yamaura | 340/310 R |

FOREIGN PATENT DOCUMENTS

| 0146045 | 11/1984 | European Pat. Off. |
| 1548652 | 3/1976 | United Kingdom |
| 2174273 | 2/1985 | United Kingdom |

OTHER PUBLICATIONS

Japanese Patent Public Disclosure No. 149242/85 Official Gazette, Applicant–Matsushia Electric Works, ltd., Inventor Hiroshi Hatano, Aug. 6, 1985, entitled "Information Transmission System".

Entitled, "Interim Report of Investigation by the Power-Line Carrier Communication Investigation Committee, published in Mar. 1985, edited by the Power-Line Carrier communication Investigation Committee of the Electric Wave Engineering Asso. Foundation.

Entitled, "A Multifunction Home Control System", by Edward Bruggeman, Honeywell Inc., 1982 IEEE International Conference on Consumer Electronics Digest of Technical Paper, pp. 154–155.

Primary Examiner—Donnie L. Crosland
Attorney, Agent, or Firm—Wolf, Greenfield & Sacks

[57] ABSTRACT

A gateway circuit which exchanges information between a leased-line information transmission system and a power line carrier information transmission system includes a control circuit which receives and formats information transmitted over the leased-line information transmission system and a separate control circuit which receives and formats information received over the power line carrier system. The formatted information is provided to a third control circuit which buffers the information and converts between the leased-line format and the power line carrier format to enable signal exchange between the two information transmission systems. The general control circuit responds to load control commands generated by manual switches located on the control unit and to load control commands forwarded over the leased-line system. The general control unit also contains storage elements which maintain the operating state of electrical loads on the power line and only transmit control information when an operating state must be changed.

10 Claims, 27 Drawing Sheets

Fig. 17
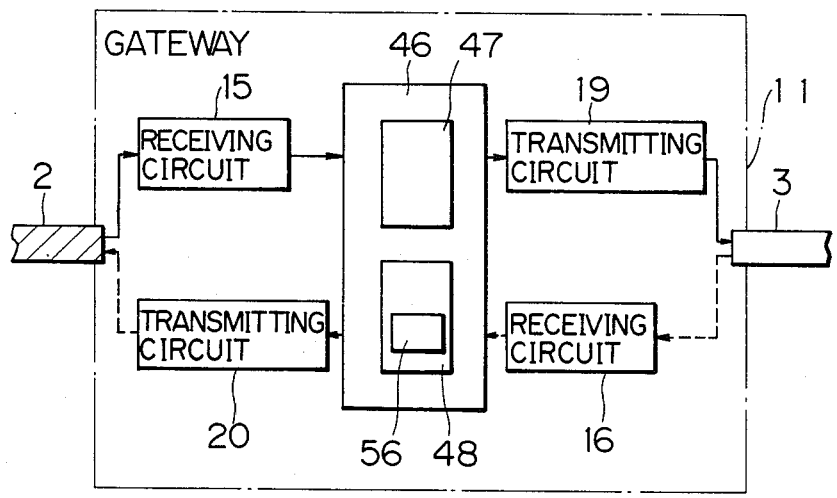
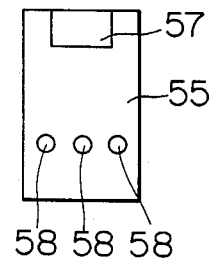

HD: HEADDER
DNA: DESTINATION NETWORK ADDRESS
LDA: LOCAL DESTINATION ADDRESS

HD: HEADDER
SNA: SOURCE NETWORK ADDRESS
LSA: LOCAL SOURCE ADDRESS

GATEWAY FOR USE IN LOAD CONTROL SYSTEM

BACKGROUND OF THE INVENTION

1. Field of the Invention

The present invention generally relates to an information transmission system for use in an automated home information system and more specifically to a gateway being provided in the information transmission system, which uses a leased line (employing, for example, a coaxial cable) and a power line as information transmission lines and exchanges information therebetween, and being used to exchange a signal between the leased and power lines.

2. Description of the Prior Art

FIG. 1 is a block diagram showing a prior art load control system for use in a house disclosed in Japanese Patent Public Disclosure No. 149242/85 Official Gazette. As shown in this figure, this load control system is provided with a leased and power lines. Reference numerals 1 indicates a dwelling house which being rebuilt or to which being made an extention. Further, reference numerals 2 and 3 indicate: a coaxial cable used as a leased line; and a power line, respectively. Furthermore, reference numeral 4 designates an additional room A which is provided with a leased-line transmission system a including: the coaxial cable 2; and a controller 5 for controlling other parts of the system a. This transmission system a controls loads 6 such as a door phone and lighting fixtures. On the other hand, reference numerals 7 and 8 indicate initially-established-rooms B and C in which loads 10, namely, lighting fixtures and plug sockets and so forth are controlled by a power-line transmission system b using a power line 3 and being provided with a controller 9 for controlling other portions of the transmission system b.

Reference numeral 11 indicates a gateway intervening between the coaxial cable 2 and the power line 3. This gateway 11 receives control signals from one of the two systems a and b and converts the format of the control signals into another format required by the other system and transmits the converted signals to the latter system when these control signals are exchanged by the two systems a and b. This permits the controller 5 to remotely control the loads 10 such as the lighting fixtures connected to the power line 3. Further, reference numeral 12 indicates a branching portion.

FIG. 2 shows the conventional manner of connecting the gateway 11 to directional couplers 13 and 14 as described in the above cited Japanese Patent Public Disclosure Official Gazette. As shown in this figure, the gateway 11 is connected to both the coaxial cable 2 and the power line 3 by way of the directional couplers 13 and 14. FIG. 3 is a block diagram showing the inner construction of the prior art gateway 11. In this figure, reference numerals 15 and 16 indicate signal detecting and receiving circuits respective which detect and receive signals from the coaxial cable 2 and those from the power line 3. Further, reference numerals 17 and 18 indicate data converting circuits which convert the format of the signals received by the circuits 15 and 16 to another format applicable to the coaxial cable 2 and the power line 3, respectively. Reference numerals 19 and 20 designate data signal transmitting circuits which are used to transmit the converted signals to the coaxial cable 2 and the power line 3, respectively. That is, this gateway 11 detects only data signals in the signal detecting and receiving circuit 15 and then convert, in the data signal converting circuit 17, the received data signal into another data signal having format applicable to the transmission on the power line 3. Furthermore, the gateway 11 sends out the converted data signal to the power line 3 through the data transmitting circuit 19. Similarly, the gate way 11 converts the data signal received from the power line 3 in the signal detecting and receiving circuit 16 and also converts the data signal into another data signal having format applicable to the transmission through the leased line in the data signal converting circuit 18 and further issues the converted signal to the leased line or coaxial cable 2.

An operation of the above described conventional gateway in case of remotely controlling loads 10 by the controller 5 of the leased-line transmission system will be explained hereinbelow by way of example.

First, the controller 5 issues a "load-on" control request signal to the coaxial cable 2. In the gateway 11, the signal detecting and receiving signal 15 receives this signal and the data signal converting circuit 17 converts this signal into a signal having another format applicable to the power line transmission system b. Further, the data signal transmitting circuit 19 sends out the converted signal to the power line 3. Next, a response signal from the load 10 indicating that the load 10 has been into an "on-state" is issued to the power line 3, that is, to the controller. This response signal is received at the signal detecting and receiving circuit 16 of the gateway 11 and is converted in the data signal converting circuit 18 into a signal having another format applicable to the leased-line transmission system a. Further, the data signal transmitting circuit 20 transmits this converted signal to the coaxial cable 2.

The above-mentioned conventional system for exchanging signals between the coaxial cable 2 and the power line 3 through the gateway 11 permits any user in each room of the dwelling house 1 to remotely control the loads such as the lighting fixtures.

The prior art gateway is constructed as above stated. Thus, a transmission of a signal from the coaxial cable 2 to the power line 3 and another transmission of a signal effected in the opposite direction are independent each other because these transmissions are effected by using two independent circuit systems as above-mentioned. Therefore, when a communication between the transmission systems a and b fails, it is impossible to localize a defective portion of the prior art gateway. This degrades reliability of the prior art gateway considerably.

Further, as described above, the prior art gateway provides functions of transmitting and receiving signals and performs only transitions of signals between the leased and power lines but does not control the transmission systems. Therefore, in case of performing a centralized control of the power line transmission system, the load control system needs further providing a controller for controlling the power-line transmission system. This results in that the load control system becomes much expensive, that much complicated communications are necessary to control the system and that an efficiency in signal processing is considerably reduced.

Furthermore, the prior art gateway constructed as above described has encountered a serious problem that efficiency in exchanging signals between the leased and power lines is low. This low efficiency is owing to a large difference in transmission rate between the leased and power lines. The leased line or coaxial cable can transmit signals at a high rate such as 9600 bps, while the power line ought to transmit signals at a low rate such as 100 bps in order to ameliorate its reliability because the power line has a relatively large noise in comparison with the leased line. For instance, the prior art gateway converts the control request signal received from the leased line and transmits the converted signal to a load through the power line having such a low transmission rate even when the load is not currently being used and disconnected to the power line. Consequently, there ought to occur many extra retransmissions of signals and very long wait for a response in the prior art system.

Moreover, the conventional information communication system constructed as above described has a defect that when signals received from the coaxial cable are uniformly converted and then transmitted to the power line, an overload is to be carried through the power line and the response from the load is harmed. This is partly because that as above-mentioned, there is a large difference in transmission rate between the leased and power lines and partly because that the information is not always transmitted in a way reasonable enough for the purpose of increasing the efficiency in the transmission.

Hereinafter, the latter reason will be more detailedly explained. First, the information to be transmitted in the automated home system is roughly classified into the following two kinds of the information:

(i) control information to be used to control domestic operations in the automated home system; and (ii) text to be used in, for example, a personal computer in the automated home system.

As to the control information, it does not matter how to represent or code the information as long as the load, for example, the light can be controlled by a certain control command and turned on. Contrarily, in case of the transmission of a text, a representation or code used to represent the information or text is very important. This is because all characters of the text are on an equal footing in constituting the information or text to be transmitted.

Therefore, in case of a transmission of data signals from the coaxial cable to the power line by way of the gateway, it is reasonable and preferable that the gateway can operate as follows:

(1) First, the gateway discriminates the control information from the text.

(2) Subsequently, the gateway compresses the discriminated control information before transmitting it to the power line. In that event, the control information is to be compressed to the extent sufficient to cause the power line transmission system to operate as it directs. On the other hand, with refrence to the data identified as a text, the gateway transmits it to the power line without compressing it.

The present invention is accomplished to solve the above described problems in the prior art.

SUMMARY OF THE INVENTION

Accordingly, it is an object of the present invention to provide an improved gateway which can supervise and control simultaneously both a transmission of a signal from the leased line to the power line and another transmission of a signal in the opposite direction.

Another object of the present invention is to provide an improved load control system in which functions of the system can be easily expanded at a low cost.

A further object of the present invention is to provide an improved load control system which has a simple procedure of communication and a high performance.

A still further object of the present invention is to provide an improved gateway being capable of efficiently performing transmissions of control signals between a leased and power lines in spite of large difference in their transmission rates.

Yet another object of the present invention is to provide an improved gateway which can reduce a load on a power line.

To achieve the foregoing objects, an improved gateway embodying the present invention is provided which includes independent first control means for controlling a communication on a leased line, independent second control means for controlling a power-line carrier communication on a power line and general control means for controlling both the first and second control means.

Here, the first and second control means perform their functions independently of and in parallel with each other.

Thereby, the reliability of the gateway can be remarkably increased.

Further, another improved gateway embodying the present invention is provided which includes exchange control means for exchanging control signals between the leased and power lines and centralized control means for effecting a centralized control of the power-line transmission system.

Thereby, an input of the information, which is necessary for remote control of loads connected to the power line, can be provided by a switch. Further, an output indicating states of the loads can be displayed.

Moreover, a further improved gateway embodying the present invention is provided which includes a control circuit having load monitoring means for monitoring states of a plurality of loads connected to the power line and for storing the states of the loads into the gateway and load control means for referring to the states stored upon receiving a load control signal and for issuing another control signal to the power line in case that a current state of a load is to be changed into another one.

Thereby, the control signals can be efficiently exchanged between the leased and power lines. Further, a burden which the power line has to perform can be much reduced.

Furthermore, a still further improved gateway embodying the present invention is provided which includes: first exchanging means for transmitting other kinds of information without changing the representation of the information between the leased and power lines; second exchanging means for changing the representaion of the control information in order to compress or expand control information data and for transmitting the compressed or expanded data to the leased or power line; and swictching circuit means for discriminating the control information from other kinds of information and for selecting what means being to be connected to a received information signal from the first and second exchanging means.

Namely, the first exchanging means is operative to transfer the text information for use in a personal computer or the like between the leased and power lines without changing the representation of the text to prevent an occurence of a transmission error. Further, the second exchanging means is operative to compress or expand the control information transmitted from the leased line and to issue the compressed information to the power line to reduce a communication load on the power line. Moreover, the switching circuit means identifies the kind of the information and select the first or second circuit means in accordance with the identified kind of the information. Thereby, the information can be efficiently transmitted between personal computers.

BRIEF DESCRIPTION OF THE DRAWINGS

The foregoing objects and advantages and other more specific objects will be apparent to those skilled in the art when proceeding through the following detailed description of illustrated embodiments of the invention, particularly when considered in connection with the accompanying drawings in which:

FIG. 17 is a block diagram showing another gateway embodying the present invention;

Incidentally, it is to be noted that like reference numerals denote like portions in the above drawings.

DETAILED DESCRIPTION OF THE PREFERRED EMBODIMENT

Figure 4:
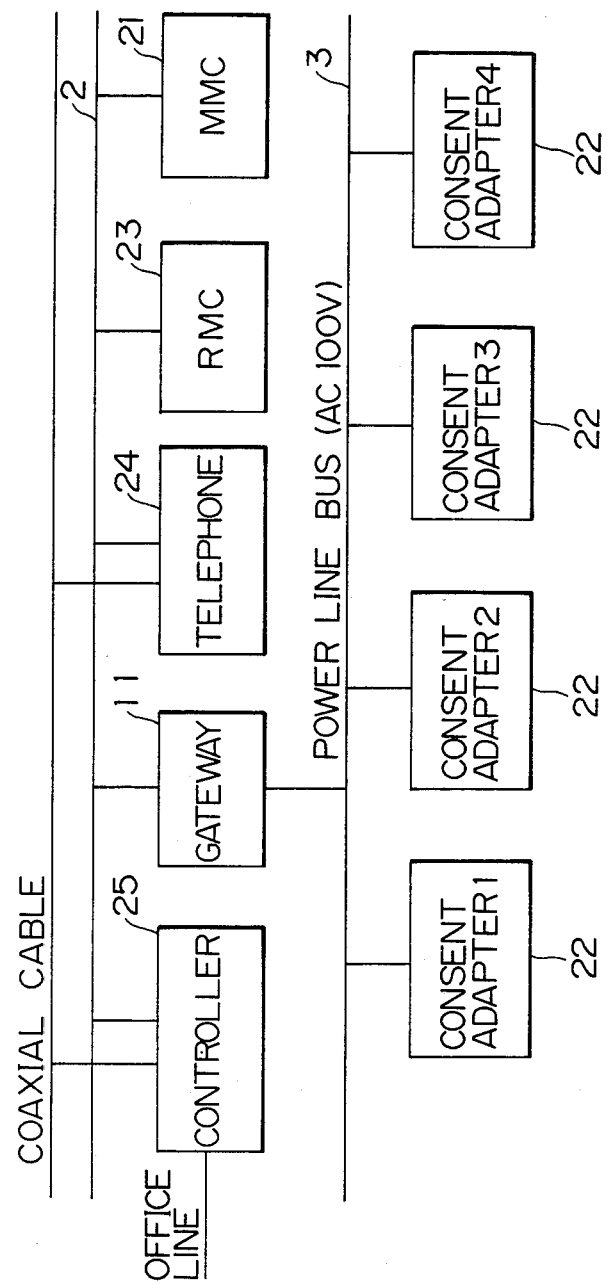
FIG. 4 is a block diagram showing a load control system which employs a gateway of the present invention.

FIG. 4 shows a load control system or home control system which employs a gateway of the present invention. In this figure, reference numerals 2, 3, 11, 21 22, 23, 24 and 25 designate a leased line or coaxial cable, a power line, a gateway, a master monitor controller (MMC), a set of consent adapters for controlling turn-on and turn-off of a load such as a lighting fixture, a room monitor controller (RMC), a telephone and a controller for a telephone system, respectively.

Figure 5:
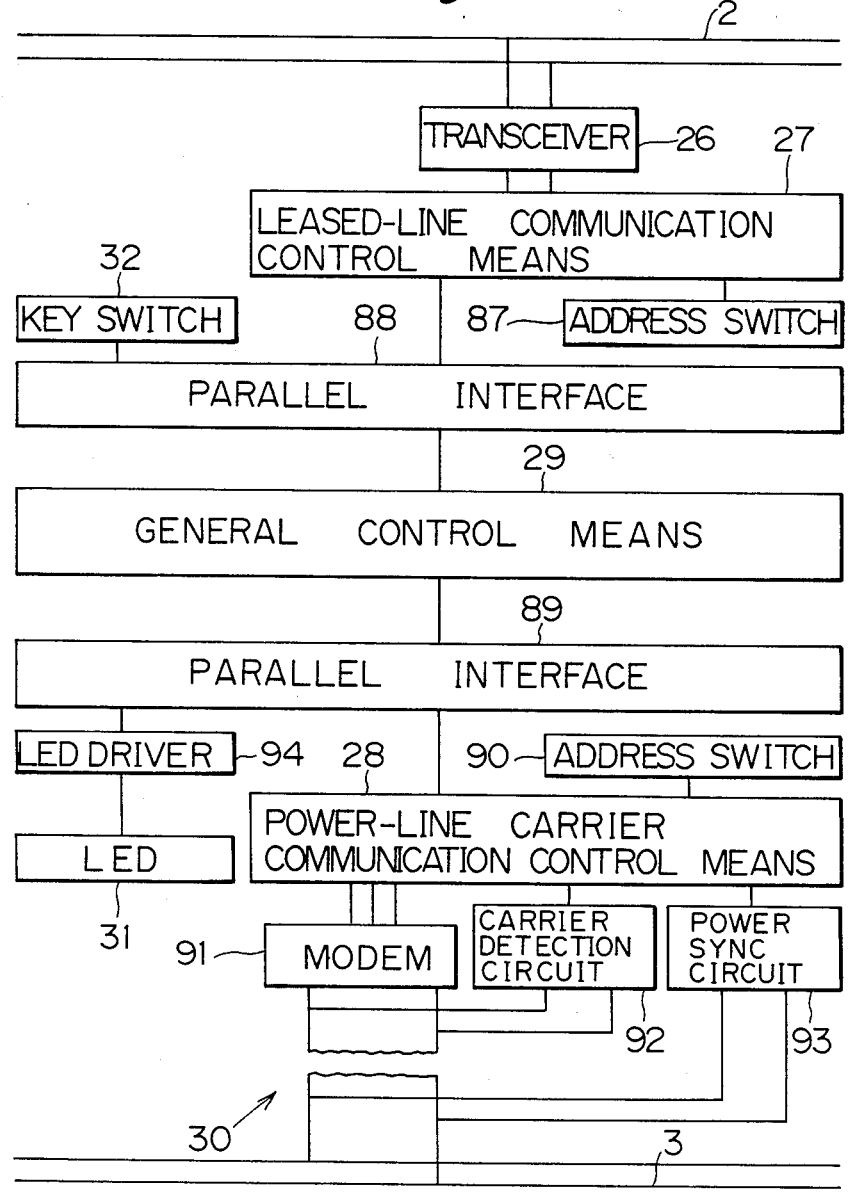
FIG. 5 is a block diagram showing a gateway embodying the present invention.

FIG. 5 schematically shows a configuration of the gateway 11. In this figure, reference numerals 26, 27, 28, 29, 30, 31 and 32 indicate a transceiver for use in a communication system using coaxial cables 2, leased-line communication control means for controlling a communication system using coaxial cables 2, power-line carrier communication control means for controlling a carrier communication using power lines, a general control means for controlling both the control means 27 and 28, a power line carrier communication connecting circuit, a light emitting diode (LED) and a key switch, respectively. Further, reference numerals 87, 88, 89, 90, 91, 92, 93 and 94 denote an address switch, a parallel interface, an address switch, a modem, a detection circuit for detecting a signal carrier, a power synchronyizing circuit and a LED driver, respectively.

Figure 6:
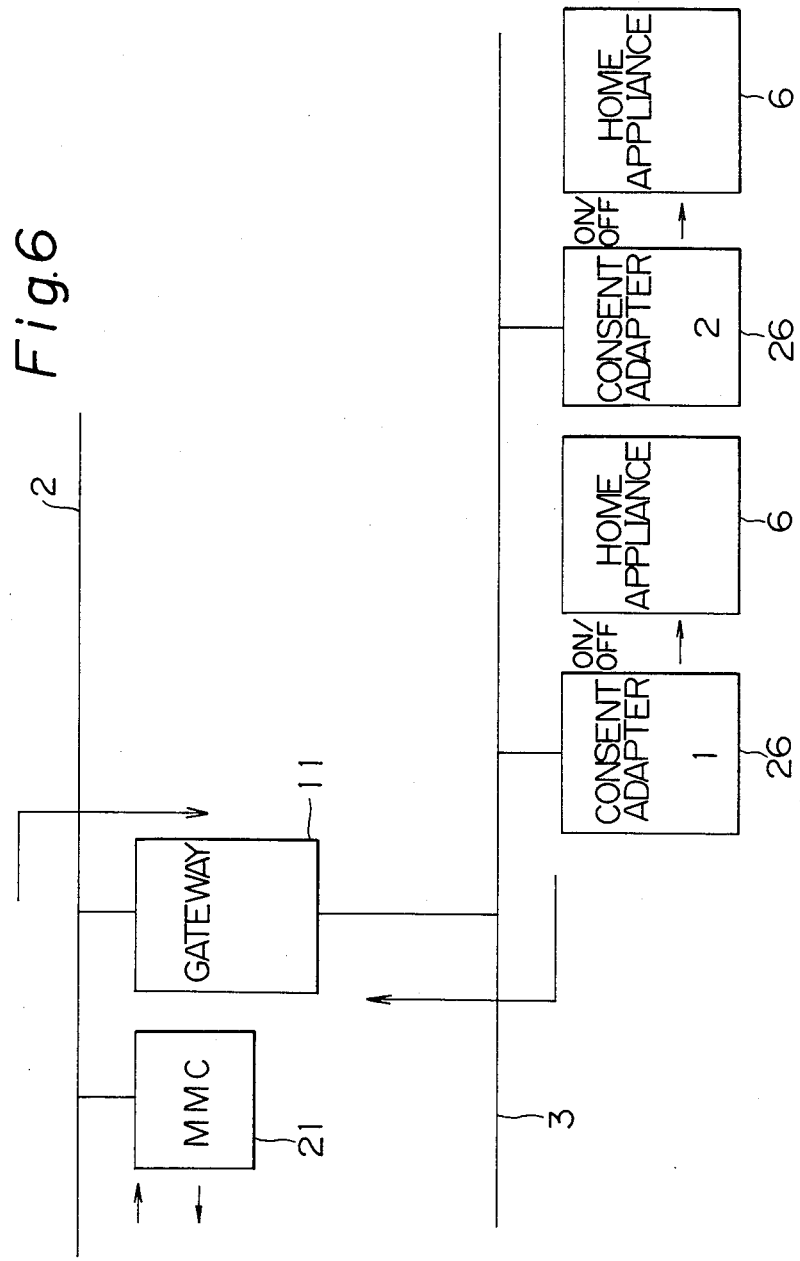
FIGS. 6 and 7 are schematic block diagrams for illustrating procedures of communications performed in the load control system of FIG. 4.
Figure 7:
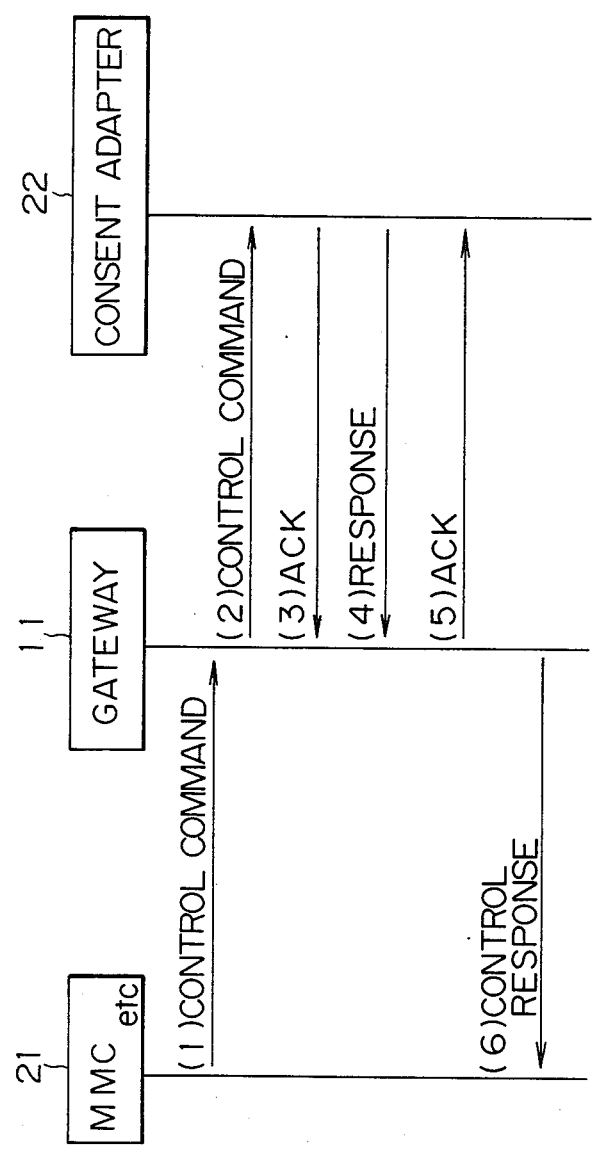

To start with, referring now to FIGS. 6 and 7, an operation of the load control system of FIG. 4 will be explained hereinbelow. FIG. 6 shows a part of the control system associated with a procedure of communication in case of controlling the consent adapters 22 by the MMC 21. Further, FIG. 7 shows the procedure of communication including the following steps or stages (1) to (6).

(1) First, when an operating switch of the MMC 21 is pushed, a control signal representing a control command is issued by the MMC 21 to the gateway 11. This control signal is transmitted through the coaxial cable 2 to the gateway 11.

(2) When the control signal reaches the gateway 11, the transceiver transforms the voltage level of the control signal and sends the converted signal to the leased-line communication control means 27 wherein the control data of the command is processed. Thereafter, the general control means 29 receives the processed data from the control means 27 and further transmits the data through the parallel interface 89 to the power-line communication control means 28 after converting the data format and buffering the data. Then, the control means 28 sends out a signal representing the control command to the connecting circuit 30 to the power line 3. Thus, the gateway 11 interprets the control command to identify one of the consent adapters 22 as a destination of the command and determine how the directed adapter is to act. Thereafter, the gateway transmits to the identified adaptor a signal representing a very brief control data required for causing the identified adapter to operate as desired by the MMC 21.

(3) On receiving the control command, a consent adapter 22 corresponding to the control command returns an ACK signal through the power line 3 to the gateway 11.

(4) In response to the received control command, the adapter sends back a monitor response data signal representing "on-state" and "off-state" of the loads 6 such as a lighting fixture and other electric home appliances to the gateway 11 after controlling the loads 6. Thus, the gateway can acknowledge that the predetermined consent adapter 22 operates in accordance with the control command.

(5) When receiving the response data signal, the gateway 11 sends back an ACK signal to the consent adapter 22 which transmits the response data signal to the gateway 11.

(6) When receiving the response data signal, the general control means 29 accepts the received signal by way of the control means 28 and sends back a control response signal to the MMC 21 through the control means 27 and the transceiver 26 upon completion of processings of converting the data format and of buffering the data and so forth.

Thus, the gateway 11 receives the monitor response data signal and adds to the recieved data other data (for example, a code indicating that the received data is a monitor data, another code indicating that the received data is sent from one of the consent adapters, the number of the consent adapter sending the monitor data and so forth) required to change the synthesized data into that having another form which can be decoded by the MMC 21. The data synthesized by adding such required data to the monitor data is then transmitted from the gateway 11 to the MMC 21 by way of the coaxial cable 2. When this data is received by the MMC 21, a display of the data is updated therein.

Next, turning back to FIG. 5, operations of the respective portions of the gateway 11 will be described hereinafter.

The transceiver 26 performs transformations of the voltage levels between the signal on the coaxial cable 2 and the leased-line communication control means 27. Further, the power-line carrier communication connecting circuit 30 is used to modulate the data transmitted from the power-line carrier communication control means 28 and then send out the modulated data to the power line 3, or conversely used to receive data from the control means 28 and modulate the received data. The general control means 29 is positioned between the leased-line communication control means 27 and the power-line carrier communication control means 28 and used to effect conversions of formats and buffering of data exchanged between the control means 27 and 28. Further, the key switch 32 is used to give the general control means 29 some control information. On the other hand, the light emitting diode 31 plays a role of a display device for displaying an operating state of the general control means 29 and the state of the consent adaptors 22 connected to the power line 3.

Figure 8:
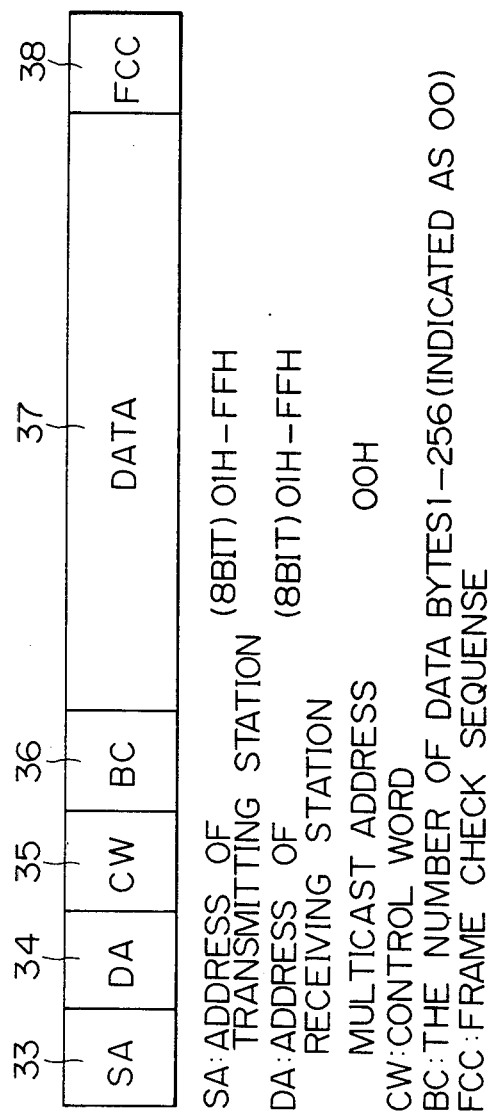
FIG. 8 is a diagram showing a frame used in communications performed on a coaxial cable.

FIG. 8 shows a structure of a frame for use in communication on the coaxial cable 2. In this figure, reference numerals 33, 34, 35, 36, 37 and 38 designate an address of a transmitting station, an address of a receiving station, a control word, a number of data words, data and a frame check sequence, respectively.

Figure 9:
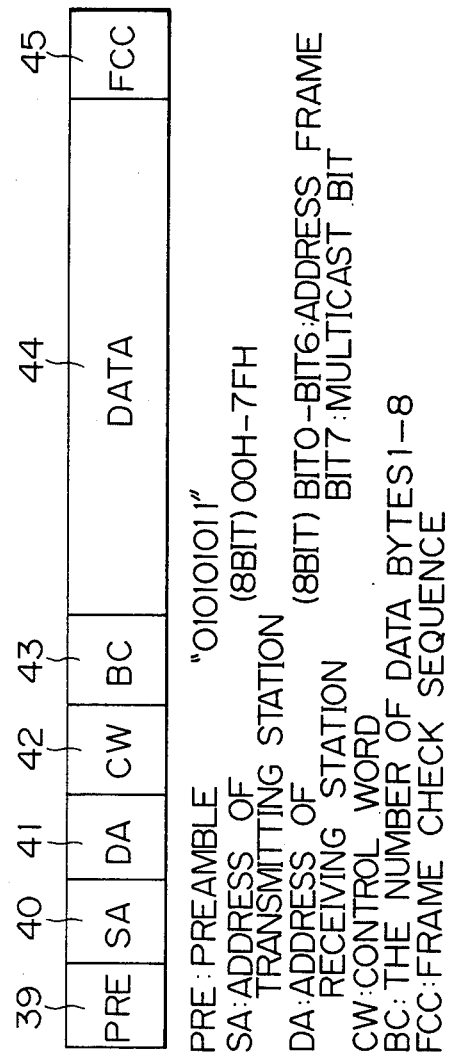
FIG. 9 is a diagram showing a frame used in communications performed on a power line.

On the other hand, FIG. 9 shows a structure of a frame for use in a communication on the leased line 3. In this figure, reference numerals 39, 40, 41, 42, 43, 44 and 45 indicate a preamble, an address of a transmitting station, an address of a receiving station, a control word, a number of data words, data and a frame check sequence, respectively.

These frames shown in FIGS. 8 and 9 are respectively provided by the communication control means 27 and 28 are are used for control of the communications performed by using the lines 2 and 3. The general control means 29 changes and modifies the structures of the frames and buffers the frames.

As above described, this gateway embodying the present invention is provided with the leased-line communication control means for independently controlling communication effected by using the leased line, the power-line carrier communication control means for independently controlling communication effected by using the power line and the general control means for generally controlling these two control means. Thus, the leased and power line control means control the corresponding communication lines independently with each other. Thereby, the gateway according to the present invention can remarkably increase the reliability. Further, the gateway of the present invention is advantageous in that the communication control means of the gateway can be easily developed and modified independently with each other and in that the cost can be reduced by fabricating each of the communication control means with a single chip microcomputer.

Incidentally, the gateway provided between the coaxial cable and the power line is above described as a preferred embodiment of the present invention. It is, however, to be noted that the network connections of the above embodiment may be replaced with any other appropriate network.

Further, in the above embodiment, each of the control means is made up of a single chip microcomputer. Here, it is to be noted that one microcomputer or two may be shared with these control means. However, it should be also noted that the configuration of the above embodiment provides the improved gateway which can prevents the occurence of substantially evil effects on the whole system due to malfunction of part of the gateway.

Figure 10:
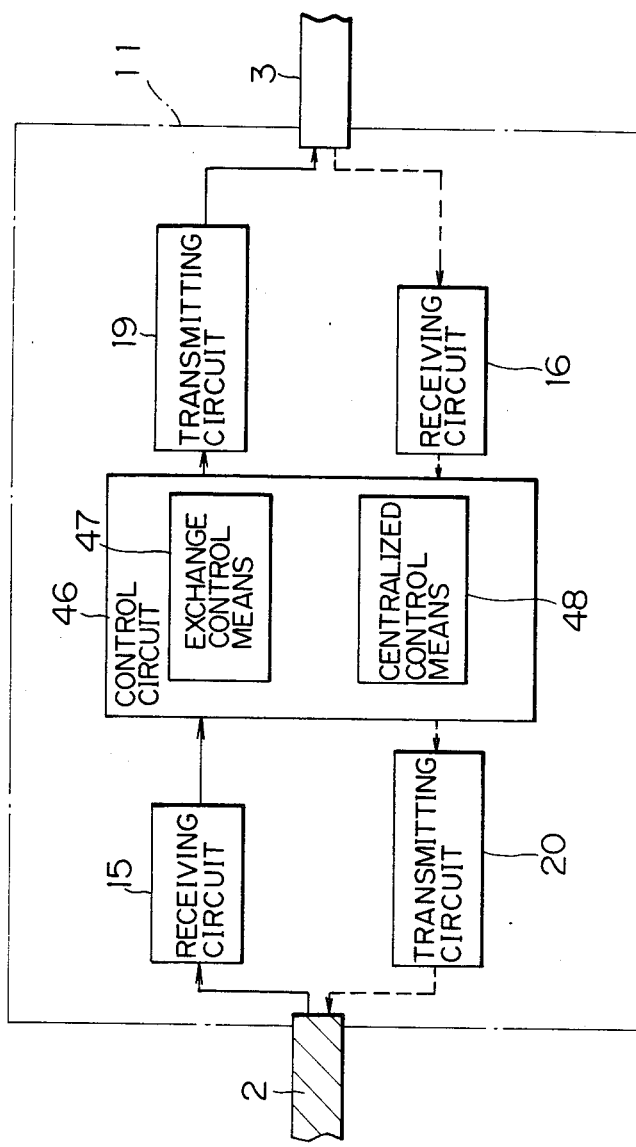
FIG. 10 is a block diagram showing a construction of a gateway of the present invention.

Turning now to FIG. 10, another embodiment of the present invention will be described hereinbelow. FIG. 10 is a block diagram schematically showing internal structure of the gateway according to the present invention provided in the load control system using both the power and leased lines. Reference numerals 2, 3, 11, 15, 16, 19, 20, 46, 47 and 48 indicate a leased line, a power line, a gateway provided between the leased and power lines, a receving circuit for receiving a signal on the leased line 2, a receiving circuit for reciving a signal on the power line 3, a transmitting circuit for transmitting a signal to the power line 3, a transmitting circuit for transmitting a signal to the leased line 2, a control circuit for controlling the circuits 15, 16, 19 and 20, an exchange control means provided in the control circuit 46 and a centralized control means also provided in the circuit 46.

Figure 11:
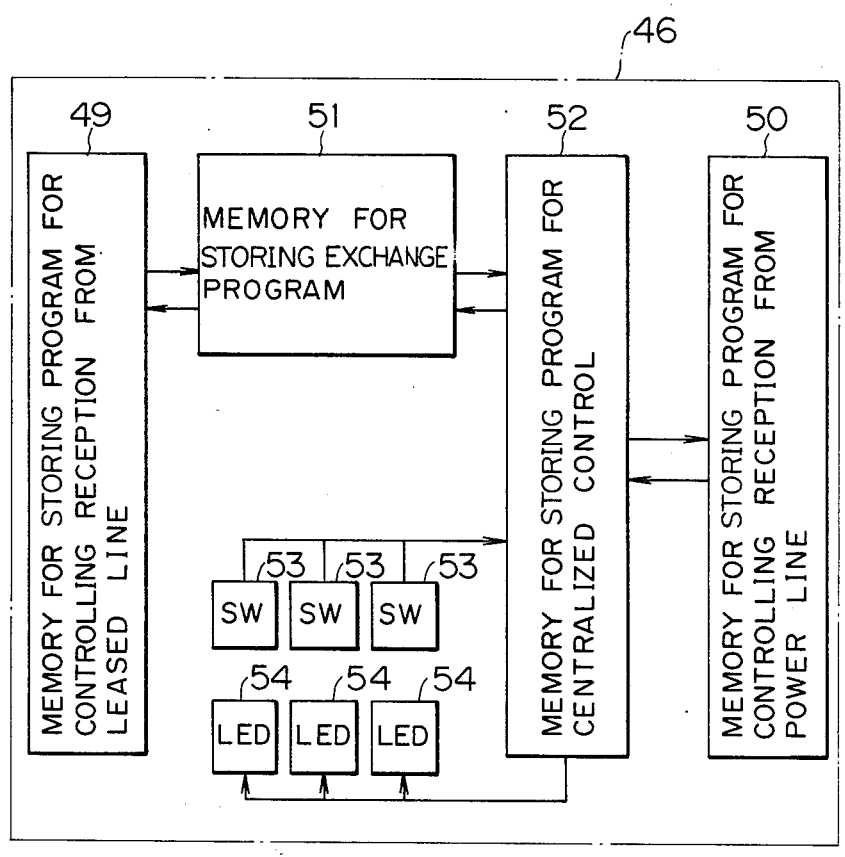
FIG. 11 is a block diagram showing a construction of an illustrated control circuit in the gateway of FIG. 10.

FIG. 11 is a block diagram showing an example of the above control circuit 46. Reference numerals 49, 50, 51, 52, 53 and 54 designate a memory which stores a program for controlling the transmitting and receiving circuit 15 and 20 for the leased line 2 therein, a memory which stores a program for controlling the transmitting and receiving circuit 16 and 19 for the power line 3 therein, a memory which stores a program for effecting an operation of transit of signals in communications using the leased and power lines therein, a memory which stores a program for an operation of the master monitor controller controlling loads connected to the power line 3, a set of input switches each corresponding to each of the loads and a light emitting diodes each corresponding to each of the loads for displaying states of the loads.

Figure 12:
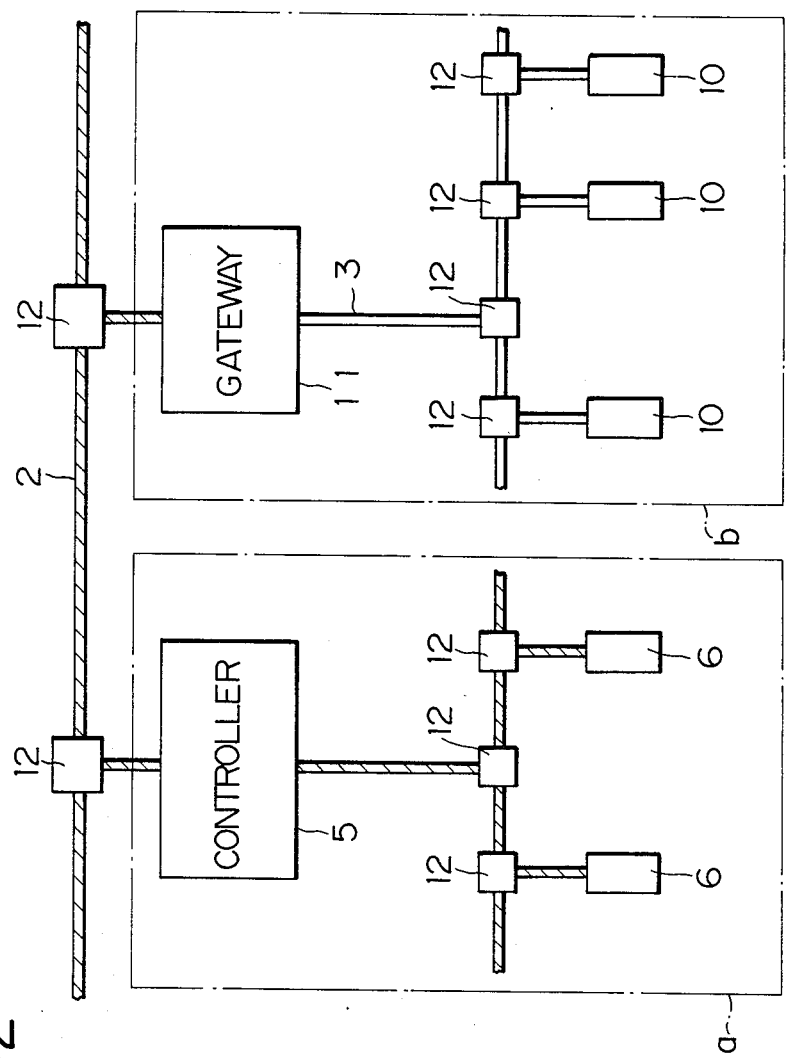
FIG. 12 is a block diagram showing a logical hierarchical structuure of a load control system which employs the gateway of FIG. 10.

FIG. 12 is a block diagram showing logical hierarchic structure of the load control system having both the leased and power lines. Reference characters 5, 6, 10, 20, (a) and (b) designate a controller for the leased-line transmiossion system, a controller for the power-line transmission system, a load, a branching portion, the leased-line transmission system and the power-line transmission system. As shown in this figure, a load 6 is positioned at a lower layer branching from the controller 5 for the leased-line transmission system. This means that the load 6 is under centralized control of the controller 5. Similarly, the load 10 is positioned at a lower layer branching from the gateway 11 as viewd in this figure and thus is under centralized control of the gateway 11. That is, the gateway 11 serves as a controller for the power-line transmissin system.

Figure 13:
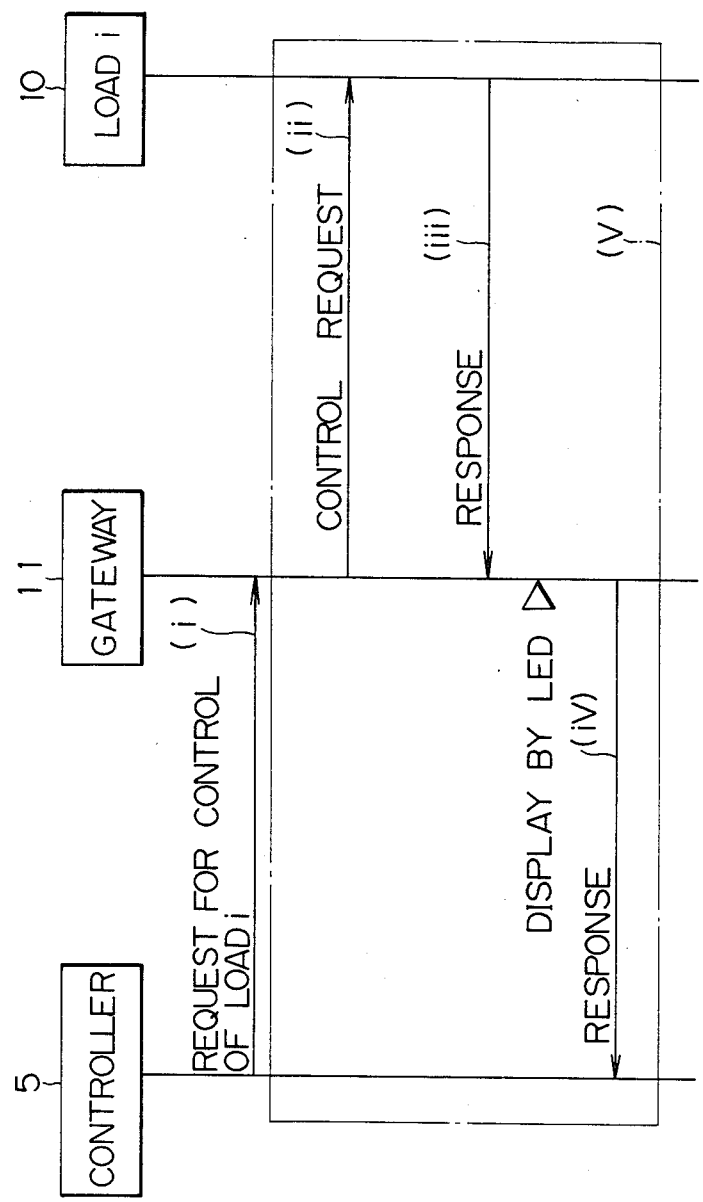
FIG. 13 is a chart for illustrating a procedure of communication performed by an exchange controlling means provided in the gateway of FIG. 10.
Figure 14:
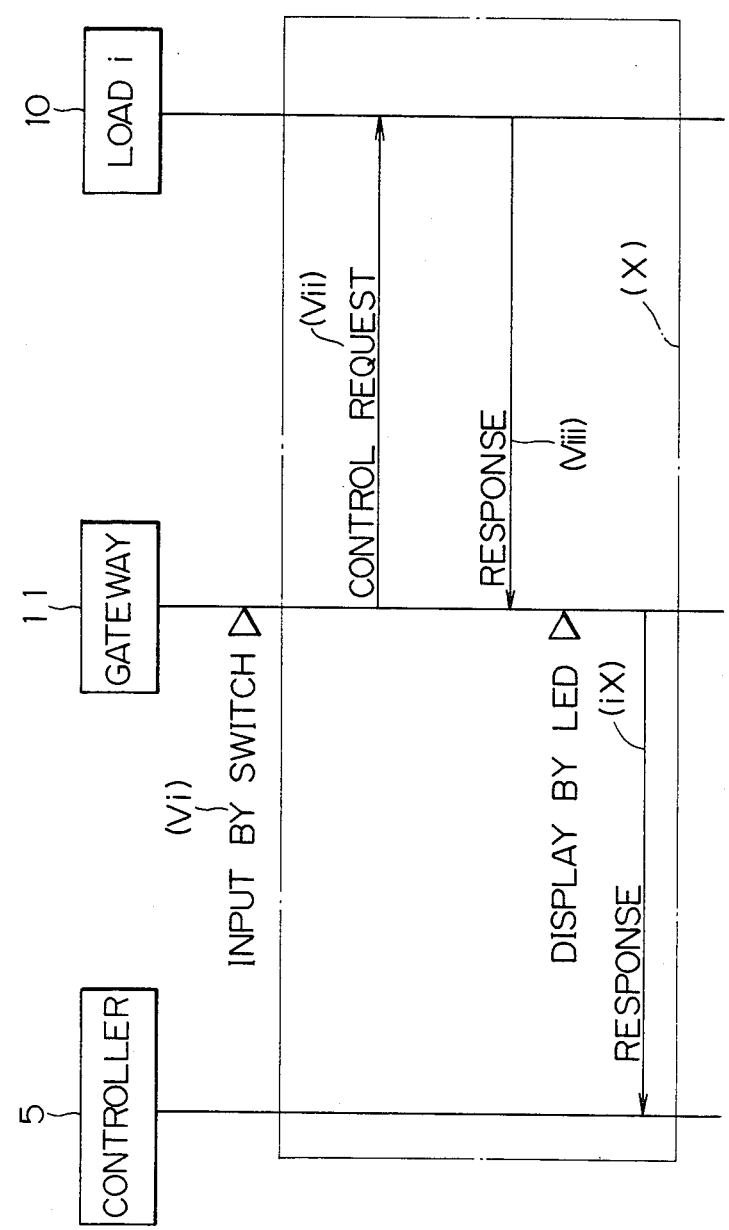
FIG. 14 is a chart for illustrating a procedure of communication performed by a centralized-control effecting means.
Figure 15:
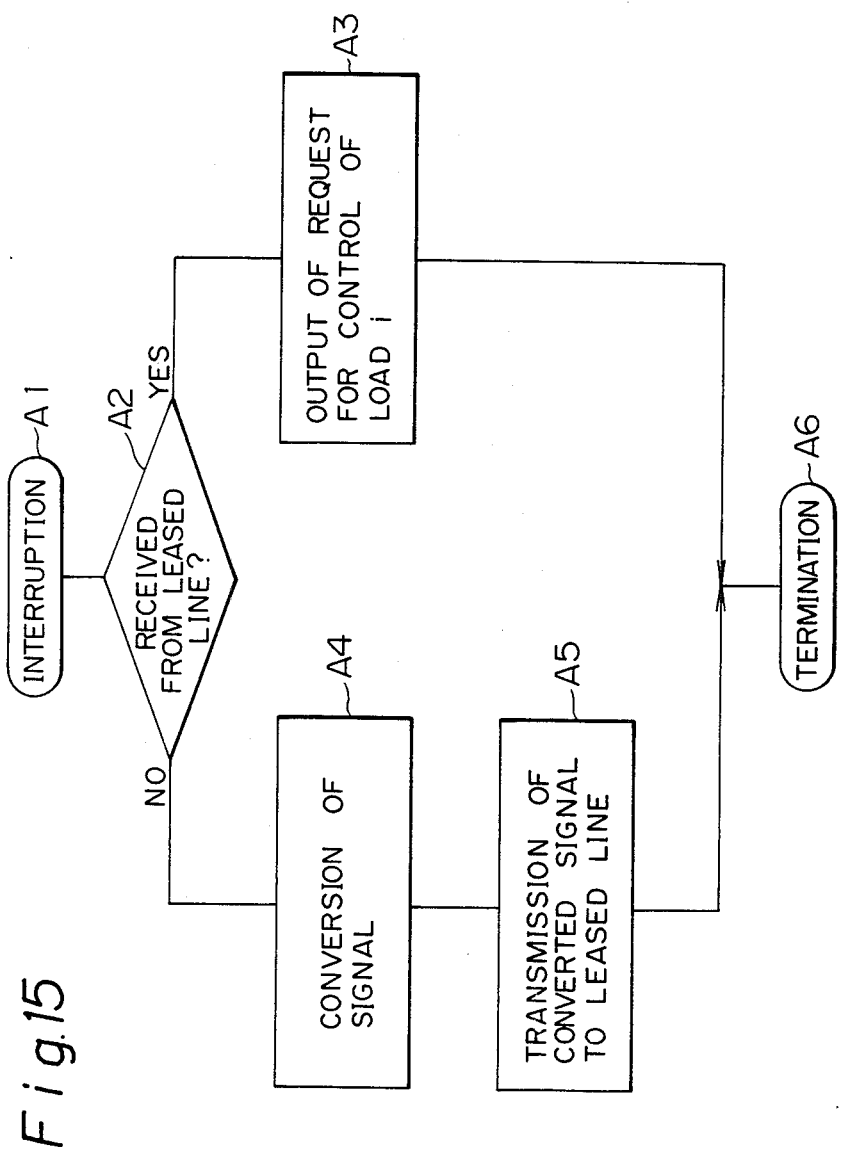
FIG. 15 is a flowchart representing an operation of an exchanging program employed in the gateway of FIG. 10.
Figure 16:
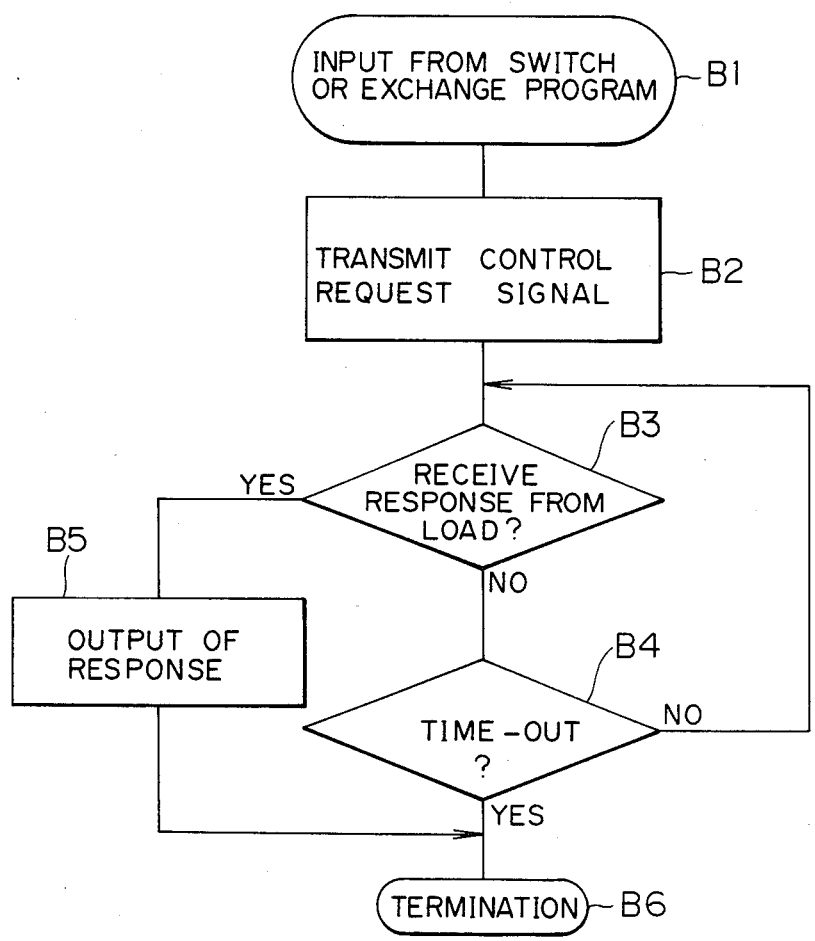
FIG. 16 is a flowchart representing an operation of a centralized-control program employed in the gateway of FIG. 10.

FIGS. 13 and 14 are charts showing procedures of communications effected by the controllers 47 and 48, respectively. FIGS. 15 and 16 are flowcharts of the operations of the programs stored in the memories 51 and 52, respectively.

Hereinafter, referring first to FIG. 13, an operation of the gateway 11 will be described as to a case that the loads connected to the power line 3 are controlled by way of the leased line 2. Further, referring to FIG. 14, an operation of the gateway 11 will be described in relation to a case that the loads connected to the power line 3 are controlled by the input means provided in the gateway 11. Load i indicates an arbitrary load connected to the power line 3. In this embodiment, reference character i denotes the number of the loads and may be 1, 2 or 3.

Referring back to FIG. 13, first of all, in stage or step (i) of the procedure shown therein, when the gateway 11 receives a signal indicating a request for controlling the load i from the controller 5 for the leased line transmission system, the control program stored in the memory 51 outputs the information of the request for the control of the load i at step A3 through steps A1 and A2 shown in FIG. 15. Then, in step (ii), the control program stored in the memory 52 receives the information of the request for controlling the load i in step B1 in FIG. 16 and further transmits a control request signal in step B2. In step (iii), after receiving a response from the load i in step B2, the control program stored in the memory 52 outputs the response information to the LED for displaying the information in step B5. Further, in step (iv), the control program stored in the memory 51 sends out the response from the load i to the controller 5 in steps A4 and A5 in FIG. 15.

Furthermore, when the information of the request for the control of the load i is input by the input switch 53 provided in the gateway 11 in step (vi) shown in FIG. 14, that is, in step B1 in FIG. 16, the control program stored in the memory 52 transmits the information of the request for the control to the load i in step (vii), that is, in corresponding step B2. Further, in case of receiving the response from the load i at Step B3, the control program 52 outputs the response information to the LED in step B5. In step (ix), the control program stored in the memory 51 converts the response from the load i and transmits the converted information to the controller 5 in steps A4 and A5.

In FIGS. 13 and 14, the parts (v) and (x) of the procedure to be effected after the information of the request for the control to the load i being input by the control programs are the same with each other. Thereby, the present invention can achieve remarkable simplification of the communication procedure and high performance in the communication in the load control system. Thus, the whole system can be economically constructed.

As above described, this gateway of the present invention in the load control system having the leased and power lines serves as not only an exchange control means but also a centralsized control means. Thus, the present invention can provide an economical load control system having high efficiency.

Incidentally, the switch provided with the gateway as the means for inputting the request for controlling the load in this embodiment may be replaced with an infrared and wireless remote-control device which can obtain the same effects as the above embodiment does. FIG. 17 is a block diagram showing a construction of the gateway which employs such a infrared wireless remote-control device as means for the request information. In this figure, reference numerals 55, 56, 57 and 58 designate an infrared and wireless remote-controller, a portion for receiving infrared rays, a portion for emitting infrared rays and the input switches corresponding to the respective loads, respectively.

Next, a third embodiment of the present invention will be described hereinbelow. This embodiment or gateway has the same internal construction as shown in FIG. 10. Therefore, the descriptions of like portions of the gateway will be omitted here.

Figure 18:
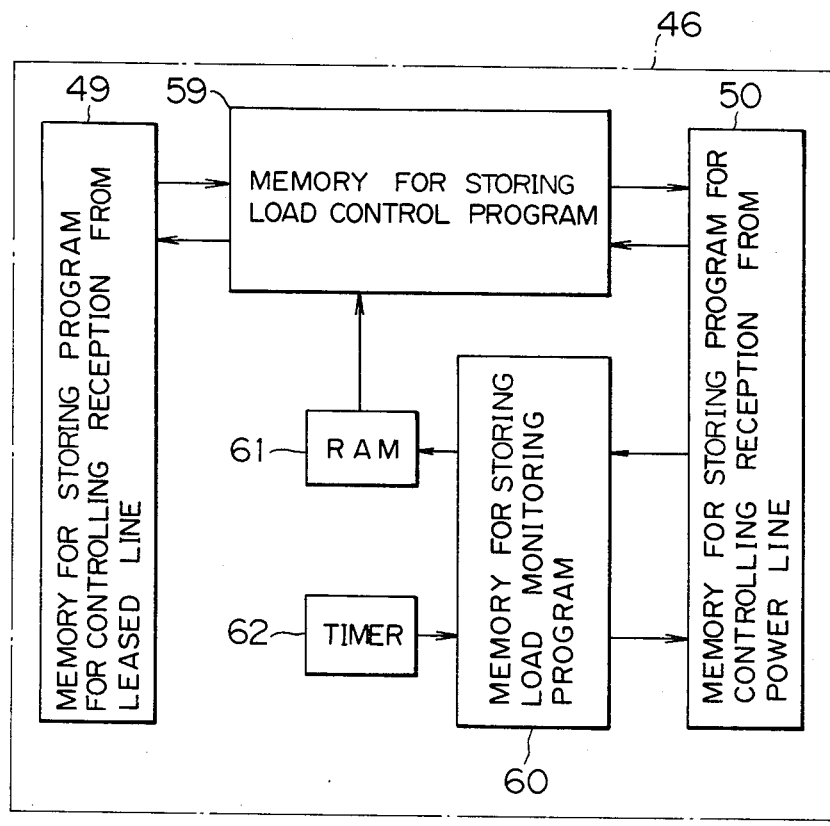
FIG. 18 is a block diagram showing an example of a control circuit in the gateway of FIG. 10.

FIG. 18 is a block diagram showing construction of another example of the control circuit 46. Reference numerals 49, 50 and 59 designate a memory used to store a program for controlling the transmitting and receiving circuits 15 and 20 for communication effected by using the leased line 2, another memory used to store a program for controlling the control circuits 16 and 19 for communication effected by using the power line 3 and a further different memory used to store a program for exchanging signals between the leased and power transmission systems for control of the loads. Further, reference numerals 60, 61 and 62 indicate a memory used to store a load monitoring program for requesting each of the loads at a predetermined interval to transmit a response signal representing its current state and for storing the responses sent from the loads, a RAM for storing not only the responses from the loads but also flags to be referred by the program for controlling the loads, a timer for outputting a trigger signal to the load moinitoring program.

Figure 1:
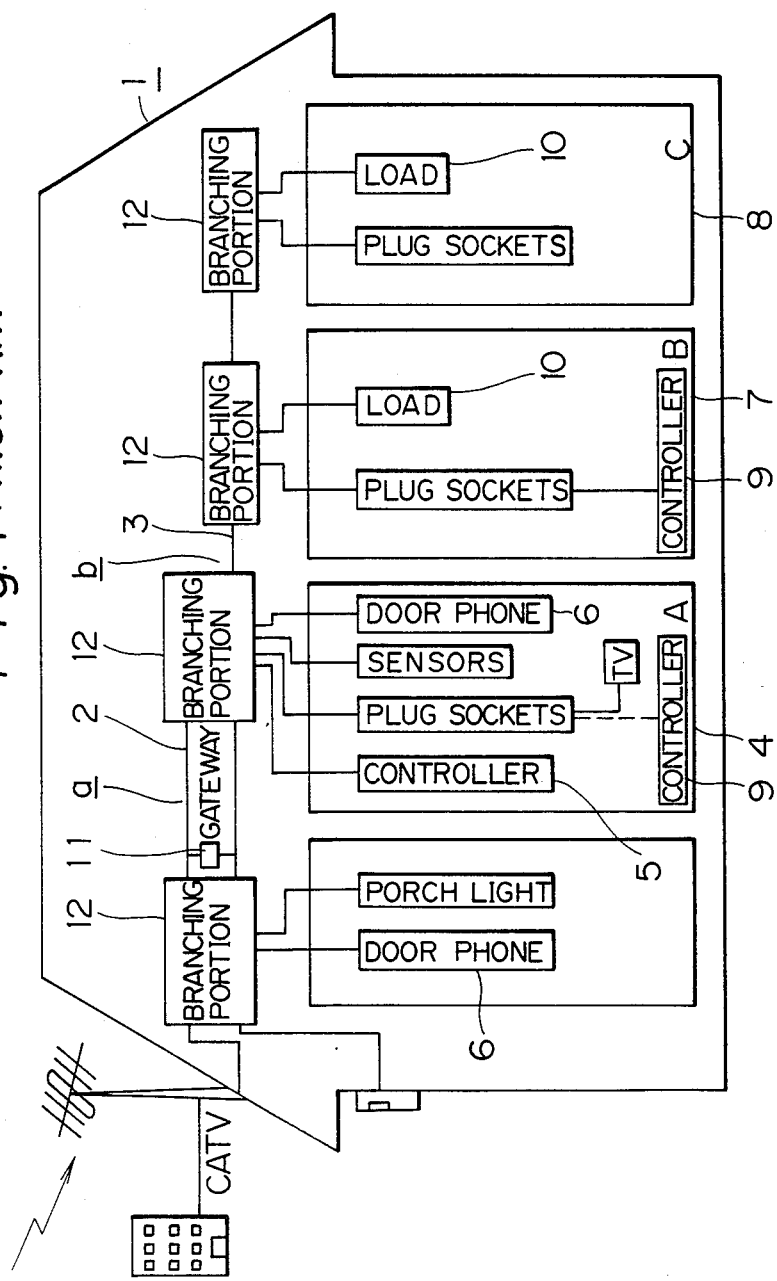
FIG. 1 is a block diagram showing a load control system which employs a conventional information transmission system.
Figure 2:
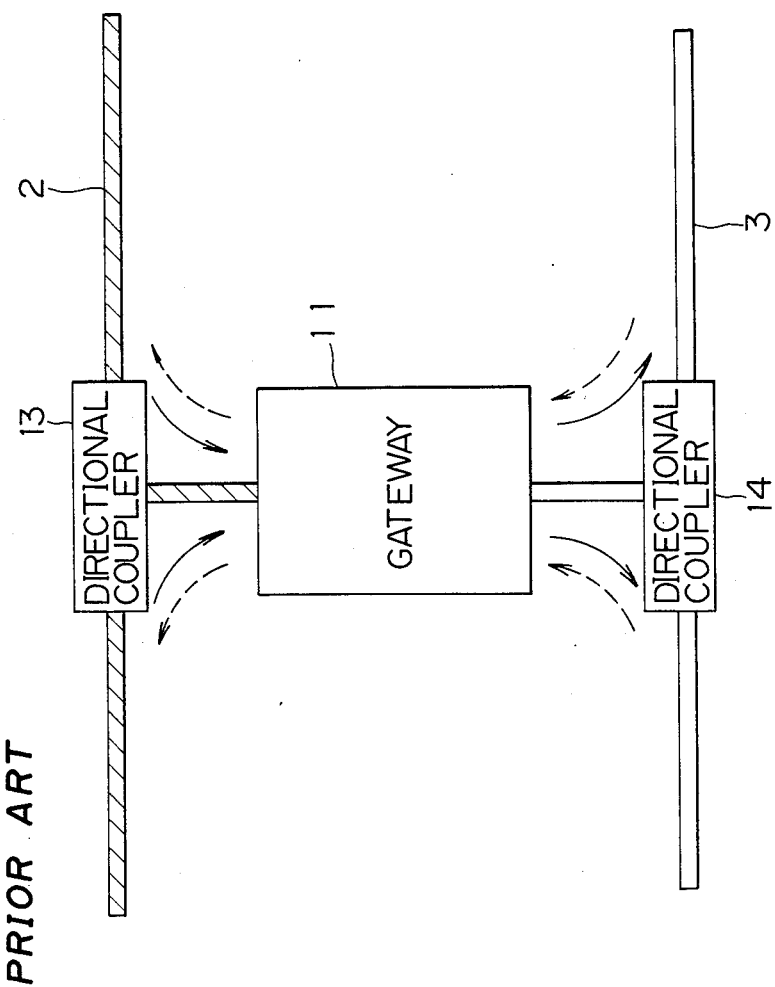
FIG. 2 is a wiring diagram showing connections of a prior art gateway to a leased and power lines.
Figure 3:
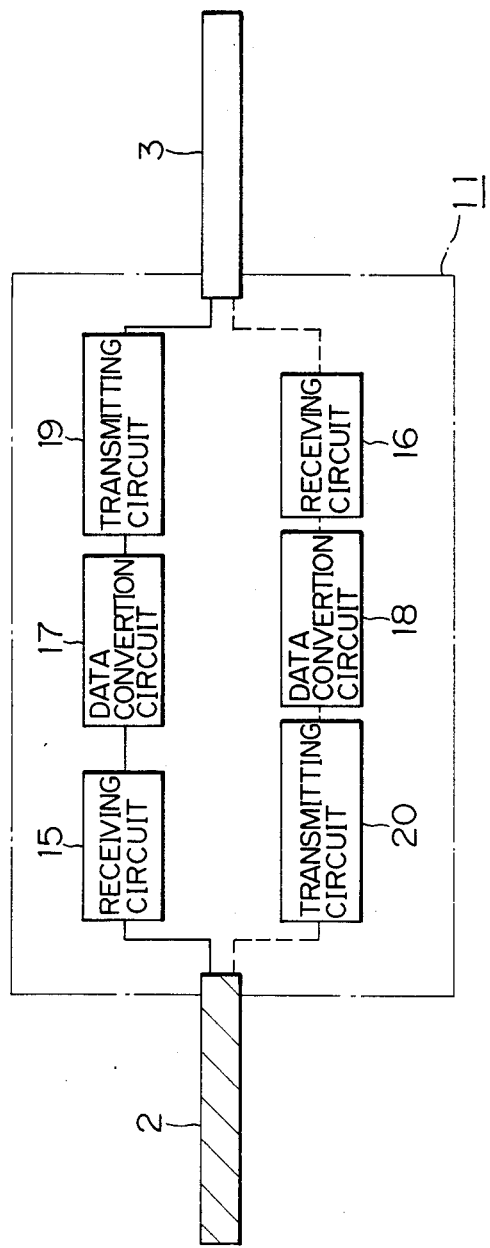
FIG. 3 is a block diagram showing a structure of the prior art gateway.

However, construction of the load control system in which the leased and power lines coexist and to which the gateway according to the present invention is the same with that of the conventional load control system show in FIG. 1 and thus detailed descriptions of parts of the load control system shown in FIG. 18 will be omitted here.

FIGS. 19, 20, 21 and 22 are a flowchart for illustrating an operation of the load monitoring program, a chart for illustrating a procedure of communication under control of the load control program, a flowchart for illustrating an operation of the load control program and a chart for illustrating a procedure of communication under control of the load control program, respectively.

Hereinafter, referring to these FIGS. 19-22, an operaion of the gateway in case of controlling the loads connected to the power line by the controller 5 for the leased-line transmission system will be described by way of example.

Figure 19:
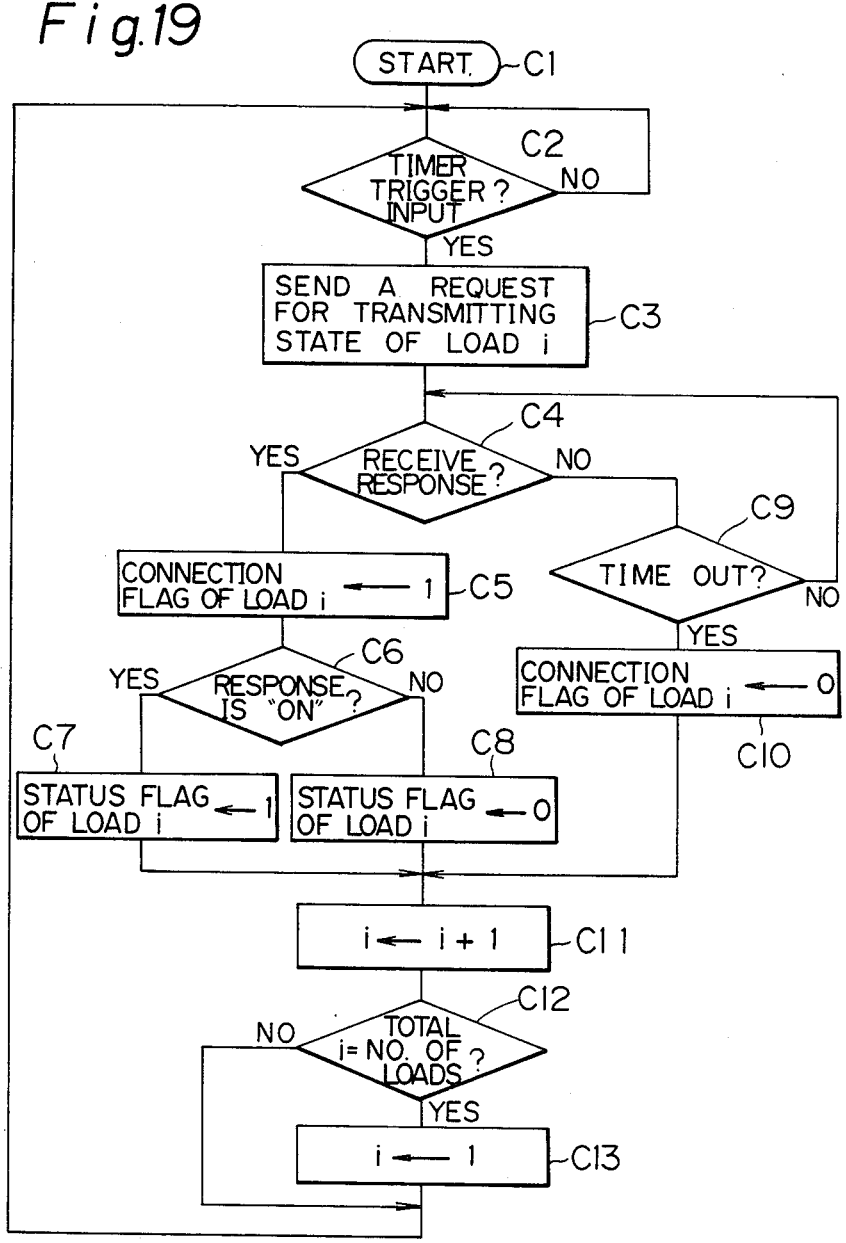
FIG. 19 is a flowchart representing an operation of a load monitoring program employed in the gateway of FIG. 10.
Figure 20:
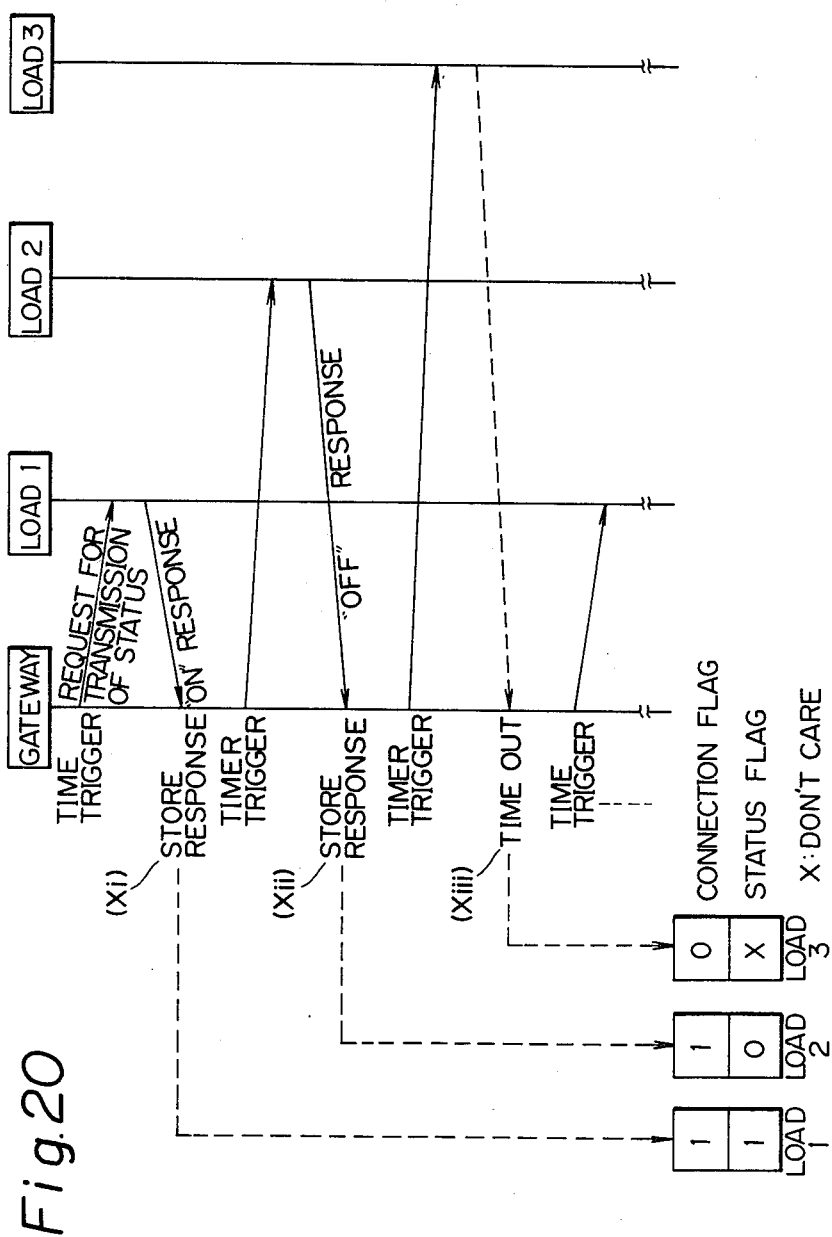
FIG. 20 is a chart for illustrating a procedure of communication performed by the load monitoring program of FIG. 19.

First, an operation of the load monitoring means will be described, referring to FIGS. 19 and 20. For simplicity of description, as shown in FIGS. 20, the total number of the loads shown in FIG. 19 is assumed to be three. When an internal trigger signal is generated from the timer 62 in step C2 in FIG. 19, the gateway 11 issues to the load i a signal representing a request for transmitting a signal indicating its current state in step C3 and waits for a response from the load i a predetermined period of time in step 4. In FIG. 20, this number "i" of the loads is assumed to be "1". If the gateway 11 receives a response from the load i during this period, a connection flag corresponding to the load i is on, that is, is set to be "1" in step C5. Further, a status flag is set in accordance with the response signal from the load i in step C6. For instance, if the response signal indicates that the state of the load i is "on-state" as the load 1 shown in step (xi) in FIG. 20, the status flag of the load i is set to be "1" in step C7 in FIG. 19. To the contrary, if the response signal indicates that the state of the load i is "off-state" as the load 2 shown in step (xii) in FIG. 20, the status flag of the load i is set to be "0" in step C8.

Further, in case that the load i does not issue a response signal as the load 3 shown in step (xiii) in FIG. 20 does and thus no response is made within a predetermined time-out period in step C9, the connection flag of the load i is set to be "0" in step C10. Moreover, in step C11, 1 is added to the number "i" of the load. If the result of the addition is less than the total number of the loads in step C12, the procedure returns to step C2 whereat the gateway waits for a new trigger signal from the timer. In the similar way, the gateway repeats the above operation with reference to the loads 1-3 in steps C12 and C13. Thus, the gateway can hold the information on the states of the loads by updating the information at predetermined regular interval.

Figure 21A:
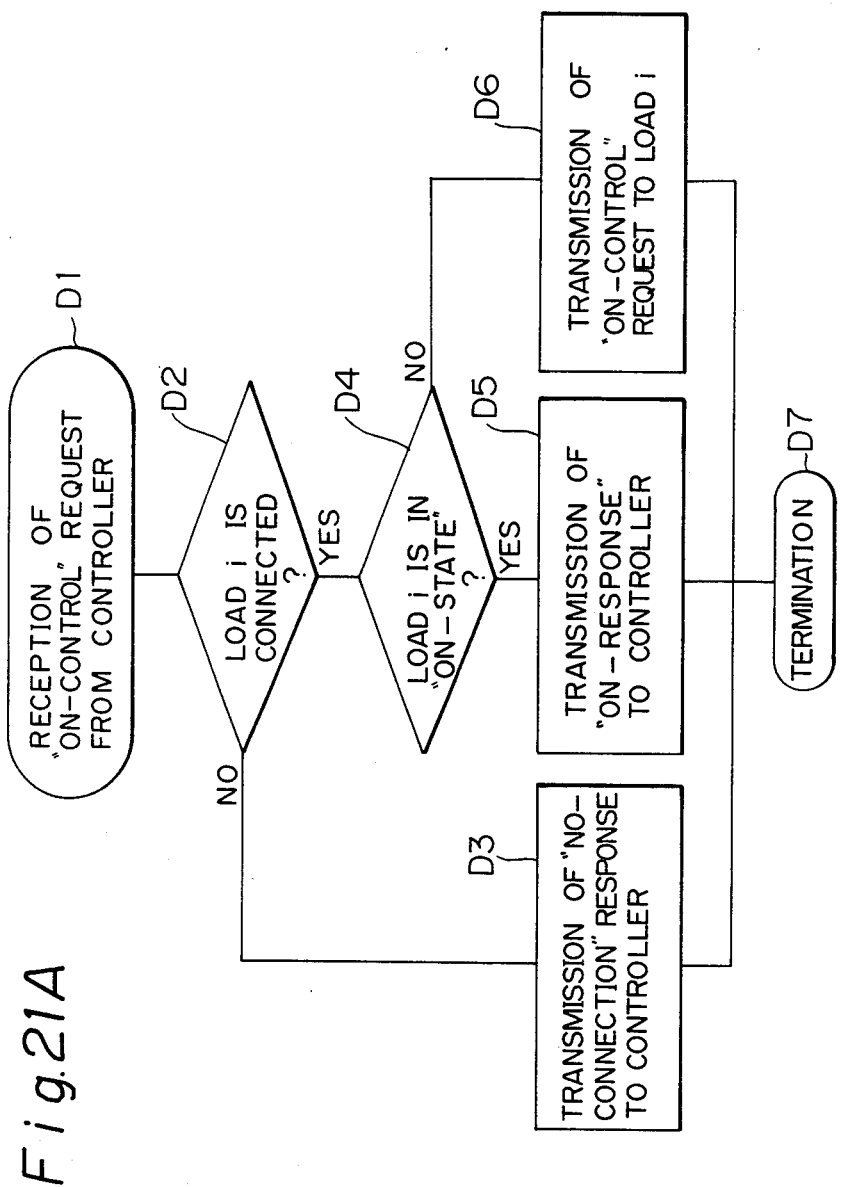
FIGS. 21A and 21B are flowcharts representing operations of a load control program employed in the gateway of FIG. 10.
Figure 21B:
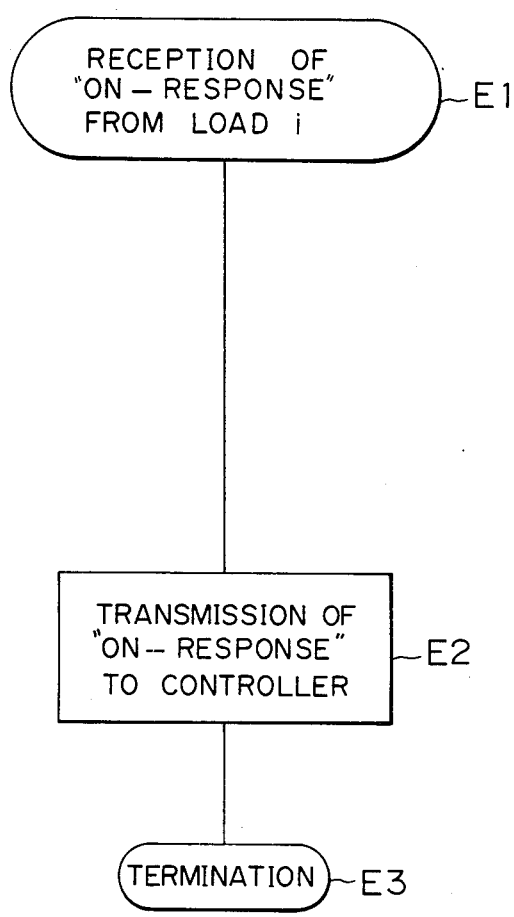
Figure 22:
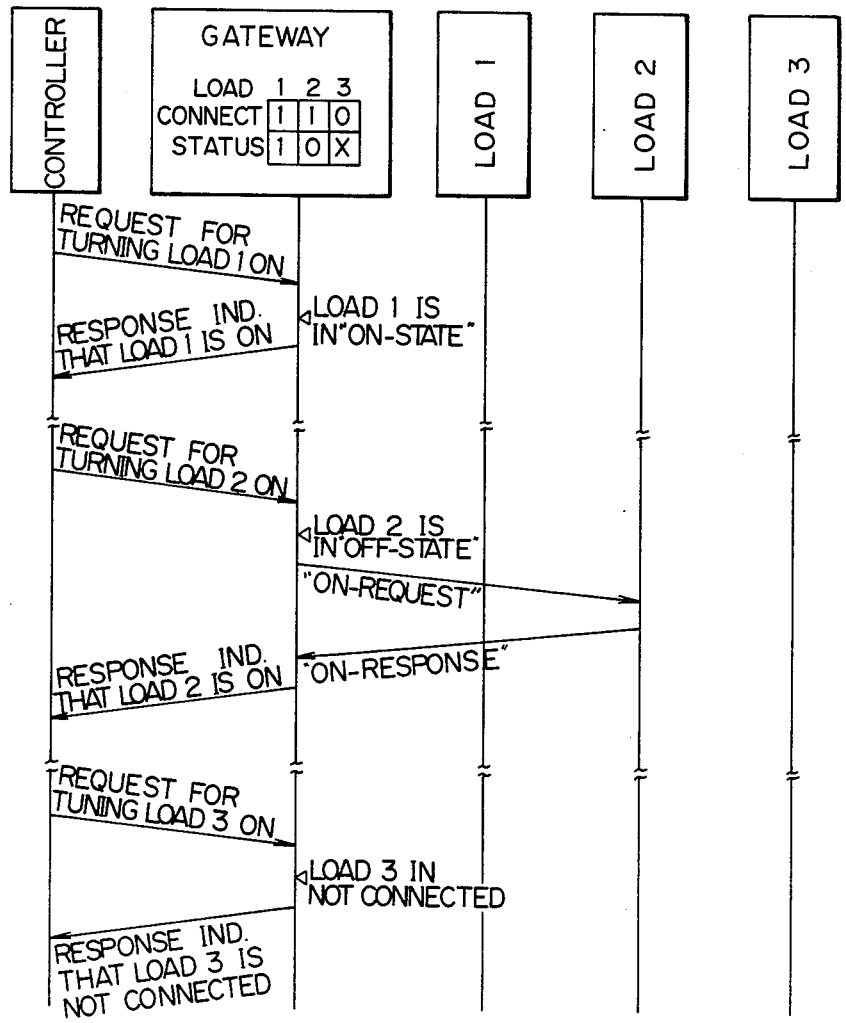
FIG. 22 is a chart for illustrating a procedure of communication performed by the load control program.

Next, referring to FIGS. 21A, 21B and 22, an operation of the load control system will be described hereinbelow. When the gateway 11 receives a signal representing a request for control of turning the load i on from the controller 5 through the leased line at the receiving circuit thereof in step D1, a connection flag corresponding to the load i is referred to by the load control program in step D2. If the connection flag corresponding to the load i is "0" as that corresponding to the load 3 as viewed in FIG. 20 is, that is, the load i is not connected to the power line, the transmitting circuit 20 sends out to the leased line a signal representing that the load i is not connected to the power line in step D3. On the other hand, in case that the connection of the flag corresponding to the load i is "1", that is, the load i is connected to the power line, the control program then refers to a status flag corresponding to the load i in step D4. If the status flag corresponding to the load i is "1" as that corresponding to the load 1 as viewed in FIG. 20, that is, the load i is in the "on-state", the transmitting circuit 20 transmits to the leased line a response signal indicating that the load i is in the "on-state" in steps D4 and D5. To the contrary, if the status flag corresponding to the load i is "0" as that corresponding to the load 2, that is, the load i is in the "off-state", the transmitting circuit 19 issues to the power line a signal representing a request for control of turning the load i off in step D6. Further, when the receiving circuit 16 receives the response signal from the load i in step E1, the control circuit in the gateway converts the received signal and then the transmitting circuit 20 transmits the converted signal to the leased line 2 in step E2.

As above stated, the gateway of the present invention converts a signal which being received from the controller through the leased line and transmits to the power line the converted signal representing a request for control of turning a load into a certain state only when the contents of the request is to change a current state of the requested load into the certain state. In the other cases that the certain state requested is the same with the current state of the load and that the load is not connected to the power line, the gateway does not convert the received signal from the controller but transmit a response signal to the leased line.

In this embodiment, at a constant interval of time, the gateway transmits onto the power line signals each representing a request for transmitting a signal indicating the current state of the load. If the gateway transmits the signal representing such a request when there is a low traffic of signals on the power line, the gateway can provide the similar effects as this embodiment does.

Furthermore, the foregoing description has been given only to the control operation in case of changing the state of the load i from the "off-state" to the "on-state". It is, however, to be noted that the control operation in case of changing the state of the load i in the opposite direction is effected in the similar manner.

As above-mentioned, in the load control system having the leased and power lines, the third embodiment or gateway of the present invention is provided with a control circuit which further includes: load monitoring means for monitoring the states of all the loads and for storing the monitored states of the loads in memory means; and load control means for referring to the state of the load stored in the memory means when receiving the load control signal and for transmitting the control signal to the power line only when the current state of the load is to be changed. Thereby, exchange of control signals can be efficiently made between the leased and power lines and thus a burden of the leased line of which transmission rate being relatively low can be much reduced.

Moreover, a fourth embodiment of the present invention will be described hereinbelow with referring to the FIGS. 23 to 29.

Figure 23:
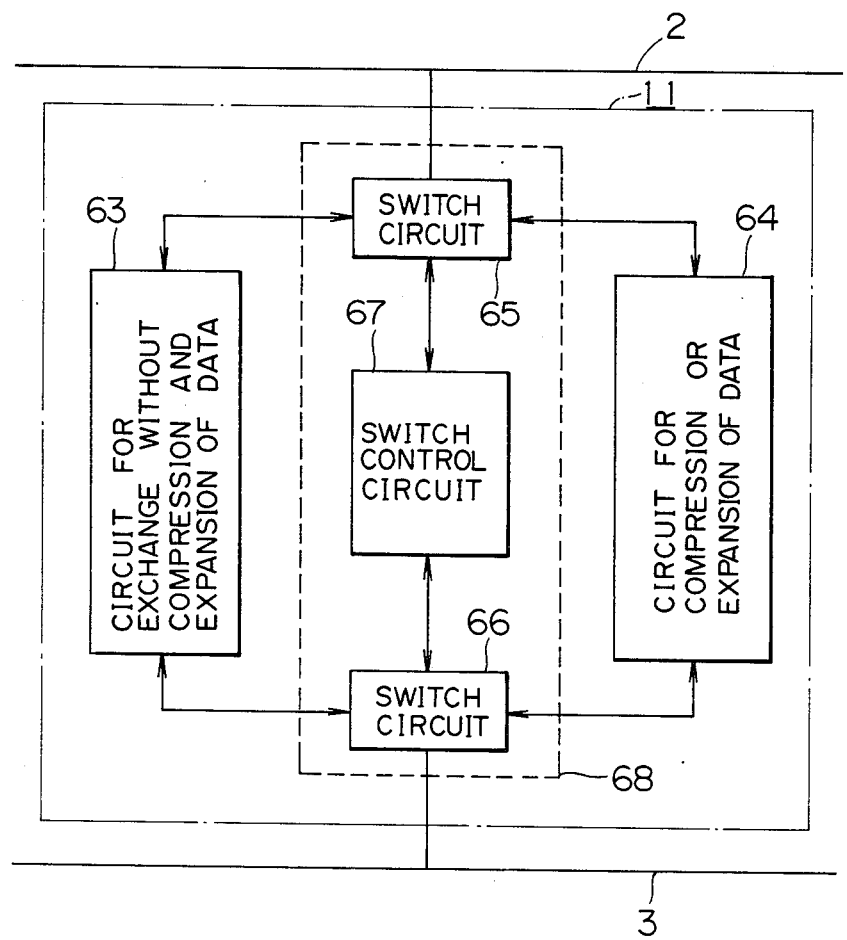
FIG. 23 is a block diagram showing another gateway employed in the load control system of FIG. 4.

FIG. 23 shows an example of construction of the fourth embodiment or gateway according to the present invention. In this figure, reference numerals 2, 3, 63, and 64 denote a coaxial cable used to be a leased line, a power line, a circuit for transmitting data represented by a signal to be exchanged between the leased and power lines without compression and expansion of data in a frame of communication, a circuit for converting the format of the data represented by the signal with compression or expansion of the data in the frame of the communication, respectively. Further, reference numerals 65 and 66 denote switching circuits and reference numeral 67 represent a switch control circuit. As shown in this figure, these circuits 65, 66 and 67 compose a change-over circuit 68.

Hereinafter, a procedure to be effected in the gateway 11 constructed above on an exchange of a signal between the leased and power lines will be described.

First, the procedure in case that a frame is transmitted from the leased line or coaxial cable 2 through the gateway 11 to the power line 3 will be described below. When the frame is received at a switching circuit 65 in the gateway 11, the received frame is then sent to the switch control circuit 67 which selects one of the circuits 63 and 64 in accordance with a code included in the received frame. For instance, the circuit 63 is selected, the received data is sent to this circuit 63 by way of the circuit 65 wherein the format of the data is converted from that required for transmission on the coaxial cable 2 to another format required for transmission on the power line 3.

On the other hand, in case that a frame is transmitted in the opposite direction, the received data is sent to the switch control circuit 67 by way of the circuit 66. Thereafter, one of the circuits 63 and 64 is selected and further, the data is sent to the circuit 65 through the selected circuit 63 or 64 to the coaxial cable 2.

As above described, the circuit 63 is used to exchange the data in the frame between the leased and power lines, so to speak, "transparently". In contrast with this, the circuit 64 sends the data to the switch circuit after compresses or expands the data included within the frame.

The home control system employing such a gateway 11 of the present invention is constructed in the same manner as shown in FIG. 4. Therefore, descriptions of parts of the home control system will be omitted hereon.

Further, in this home control system, procedures of communication in case of controlling the consent adaptors 22 by the controller 21 are the same with those shown in FIG. 7.

Figure 24:
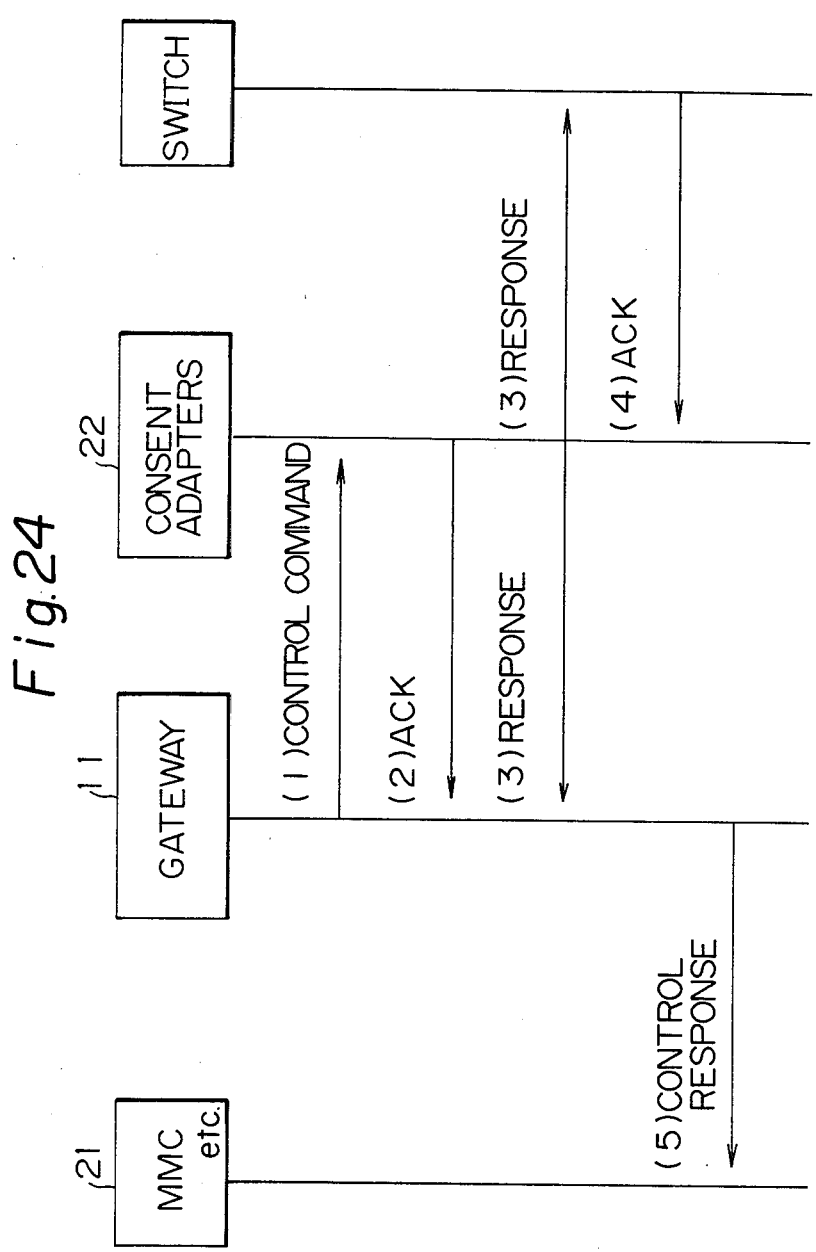
FIG. 24 is a block diagram for illustrating a procedure of communication performed by the system of FIG. 4.

FIG. 24 shows a sequence of procedures in case that the gateway 11 directly issues a control command. As shown in this figure, a monitor response is transmitted by the gateway 11 to the MMC. The format of the frame to be transmitted on the coaxial cable 2 of this home control system is the same with that shown in FIG. 8. Further, the format of the frame to be transmitted on the power line 3 is the same with that shown in FIG. 9. These two formats of the frames are substantially the same with each other except that the length of the data included in the frame transmitted on the coaxial cable 2 is 5 bytes or more while that of the data in the frame on the power line 3 is equal to or less than 1 byte. This is because that many and various terminals are connected to the coaxial cable 2 and require many kinds of control information. Thus, transmission of data on the coaxial cable necessarily reqires expandable representation of data and, as a consequence, a relatively long length of data is used therein. To the contrary, in case of transmission on the power line, equipments connected to the power line are relatively simple loads each of which needs control information only for turning it on and turning it off. Moreover, transmission rate is relatively low and data of short length is preferable.

Therefore, the gateway 11 compresses data in case of transmitting the information for home control from the coaxial cable 2 to the power line but contrarily adds additional necessary data to the information in case of transmission of the information in the opposite direction.

Next, a procedure of communuicating text information among personal computers and so on will be described hereinbelow.

Figure 25:
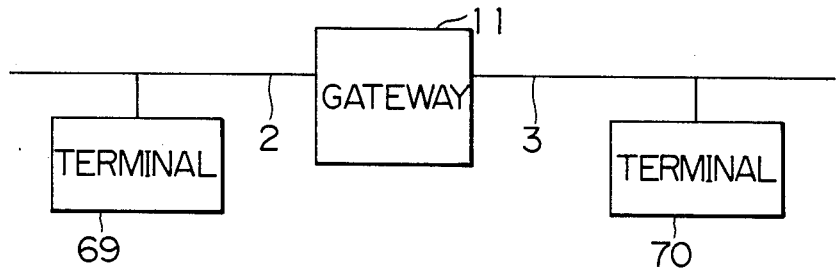
FIG. 25 is a block diagram showing another information transmission system which employs a gateway embodying the present invention.

In FIG. 25, reference numerals 69 and 70 denote a set of terminals such as personal computers connected to the coaxial cable 2 and another set of terminals such as personal computers connected to the power line 3, respectively.

Differently from the case of transmission of information in the home control system as above described, in case of transmission of information such as text among personal computers, data is transmitted and received in the same representaion without compression and expansion thereof among the personal computers. The gateway 11 is not required to interpret and convert detail portions of data but to transmit the data as it is.

Figure 26:
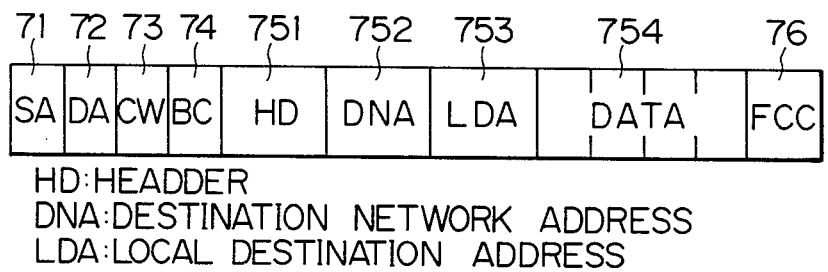
FIG. 26 is a diagram showing a frame used for a transmission of a signal from a terminal in the system of FIG. 25.
Figure 27:
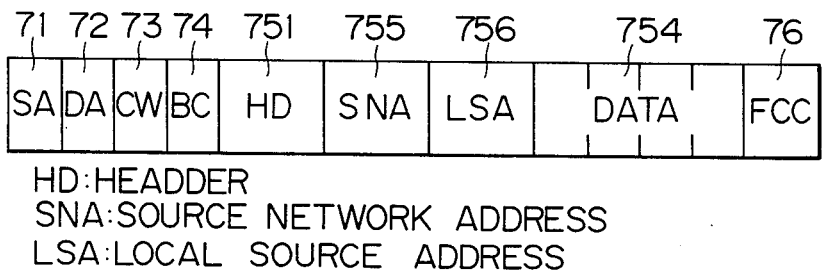
FIG. 27 is a diagram showing a frame used for a transmission of a signal to a terminal in the system of FIG. 25.

Both FIGS. 26 and 27 show frames transmitted on the coaxial cable 2. That is, FIG. 26 shows the frame transmitted from the terminal 69 and on the other hand FIG. 27 is the frame transmitted to the terminal 69.

In FIG. 26, reference numeral 751 designates a headder portion which indicates that the information is text data and is to be exchanged without compression and expansion. Reference numeral 752 denotes a destination network address indicating that the information is to be transmitted to the power line. Further, reference nunmerals 753 and 754 designate an address of a terminal connected to the power line 3 and data to be transmitted to the terminal, respectively. By usuing the formats shown in FIGS. 26 and 27 above, transmission of data is perfomed among the personal computers.

Moreover, the headder portion 751 is used to discriminate whether or not the information is to be compressed or expanded on transmission thereof. Thus, the headder portion 751 is first filled with control data indicating whether or not the data division of the information is to be compressed or expanded. Thereafter, the information including the headder portion 751 is transmitted to the gateway 11. On receiving the information, the gateway 11 effects decides whether or not to perform the compression or expansion of the received data in accordance with the contents of the headder portion and then effects the transmission of the information to the personal computer and so on.

Figure 28:
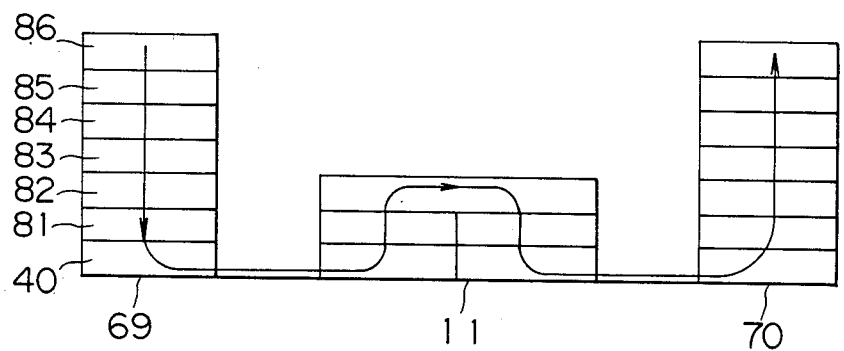
FIG. 28 is a diagram for illustrating a layered structure of a protocol in case of communications without changing a representation of control information.
Figure 29:
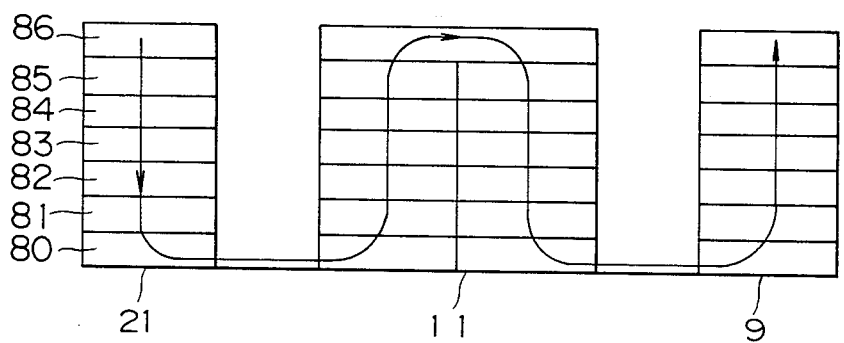
FIG. 29 is a diagram for illustrating a layered structure of a protocol in case of communications with changing a representation of a control information.

FIGS. 28 and 29 show the communications protocol by using hierarchical representation. In these drawings, reference numerals 80, 81, 82, 83, 84, 85 and 86 denote a physical layer, data link layer, network layer, transport layer, a session layer, a representation layer and an application layer, respectively.

FIG. 28 shows connections between the layers in which data from equipments connect to each other when the gateway 11 exchanges the information without compression or expansion of the data. As shown in this figure, the data from the terminal equipments 69 connect to each other in the gateway 11 at the network layer 82.

FIG. 29 shows connections between the layers relating to data from equipments when the gateway 11 transmits the information after compression or expansion of the data division. The data from the controller 21 is once interpreted in the gateway 11 and further converted by the compression or expansion of the data division thereof. The converted data is transmitted to and received by the consent controller 9.

As above described, the fourth embodiment or gateway of the present invention is provided with a converting and transmitting circuit for converting representation of control information to be exchanged between the leased line capable of transmitting digital signals thereon at a high transmission rate and the power line transmitting digital signals thereon at a relatively low transmission rate and for transmitting the converted control information to the gateway provided between the leased and power lines, a "simple" transmission circuit for transmitting the data such as text information without compression or expansion of the data and a switching circuit for selecting one of the converting and transmitting circuit and the "simple" transmission circuit. Thereby, communication load on the power line can be reduced to a minimum and transmission of text between the leased and power lines can be realized.

The foregoing descriptions of the preferred embodiments are given only to the exchange of the information and data between the leased and power lines. However, it is apparent to those skilled in the art that the present invention can be applied to any networks and that the protocol layer at which data from the controller and terminals connected to each other can be arbitrarily selected.

It is further to be understood by those skilled in the art that the foregoing descriptions relate only to preferred embodiments of the invention and that various changes and modifications may be made in the invention without departing from the spirit and scope thereof.

We claim:

1. In a gateway circuit providing a communication path for digital data and control signals between a leased line and an electrical power line, said gateway circuit having a leased line transceiver for transmitting data and control signals to, and receiving data and control signals from, said leased line in a first data format and a power line carrier transceiver for transmitting data and control signals to, and receiving data and control signals from, said power line by means of power line carrier in a second data format, the improvement comprising:
    first converting means responsive to said leased line data and control signals for converting between said first data format and a third data format;
    second converting means responsive to said power line carrier data and control signals for converting between said second data format and a fourth data format;
    means responsive to data in said format for temporarily storing said third format data;
    means responsive to data in said fourth format for temporarily storing said fourth format data; and
    means for converting between stored data in said third format and stored data in said fourth format so that data can be transferred between said leased line and said power line.

2. A gateway as set forth in claim 1 wherein said first and said second converting means are each constructed with a single-chip microcomputer.

3. In an electrical load control system, a gateway circuit for controlling signals to be exchanged between a leased-line information transmission system and a power-line carrier information transmission system, said gateway circuit comprising:
    first transmitting and receiving circuit means for transmitting information signals to a leased-line and for receiving information signals from said leased-line;
    second transmitting and receiving circuit means for transmitting information signals to a power-line and for receiving information signals from said power-line;
    general control circuit means for controlling and coordinating the operation of said first and said second transmitting and receiving circuit means, said general control circuit comprising:
        exchange control means responsive to information signals received from said first and said second transmitting and receiving circuit means for controlling exchange of signals between said leased line information transmission system and said power line carrier information transmission system; and
        centralized control means responsive to information signals received from said first and said second transmitting and receiving circuit means for exchanging control signals with said power line carrier information transmission system in order to control load devices connected to said power line.

4. In an electrical load control system, a gateway circuit as set forth in claim 3 wherein said general control circuit means further comprises manually-operated input means for generating first direct load control signals to control electrical loads on said power line and wherein said centralized control means is responsive to said first direct load control signals to generate and transmit control signals to said power line to control selected electrical loads thereon.

5. In an electrical load control system, a gateway circuit as set forth in claim 4 wherein said exchange control means is responsive to control signals on said leased line for generating second direct load control signals and wherein said centralized control means is responsive to said second direct load control signals to generate and transmit control signals to said power line to control selected electrical loads thereon and further wherein said centralized control means is responsive to operating state signals issued from electrical loads connected to said power line for generating load state signals, said exchange control means being responsive to said load state signals for transmitting said load state signals to said leased line.

6. In an electrical load control system, a gateway circuit for controlling signals to be exchanged between a leased-line information transmission system and a power-line carrier information transmission system, said gateway circuit comprising:
    first transmitting and receiving circuit means for transmitting information signals to a leased-line and for receiving information signals from said leased-line;
    second transmitting and receiving circuit means for transmitting information signals to a power-line and for receiving information signals from said power-line;

general control circuit means for controlling and coordinating the operation of said first and said second transmitting and receiving circuit means, said general control circuit comprising:

load monitoring means responsive to operating state signals issued from electrical loads connected to said power line for storing the operating states of said loads; and load control means responsive to electrical load state information stored in said load monitoring means and to control signals received from said first transmitting and receiving circuit means for controlling said second transmitting and receiving circuit means to transmit load control signals to said power line when the current state of an electrical load is to be changed.

7. In an electrical load control system, a gateway as set forth in claim 6 wherein said load monitoring means controls said second transmitting and receiving circuit means to periodically generate and transmit polling signals to all electrical loads on said power line, each of said loads being responsive to said polling signals to transmit the operating state of the load to said second transmitting and receiving circuit means and wherein said load monitoring means is arranged to store the operating states of said loads received from said second transmitting and receiving circuit means.

8. In an electrical load control system, a gateway as set forth in claim 6 wherein said load control means comprises means responsive to electrical load state information stored in said load monitoring means and to first control signals received from said first transmitting and receiving circuit means for for controlling said second transmitting and receiving circuit means to transmit a second control signal to a selected one of said loads to change the current operating state of said selected one of said loads if the operating state represented by said first control signals is not the same as the operating state of said selected one of said loads stored in said load monitor means.

9. In an electrical load control system, a gateway circuit for controlling signals to be exchanged between a leased-line information transmission system and a power-line carrier information transmission system, said gateway circuit comprising:

first exchanging means connected to said leased-line information transmission system and to said power-line carrier information transmission system for exchanging information between said leased-line information transmission system and said power-line carrier information transmission system without compressing or expanding said information;

second exchanging means connected to said leased-line information transmission system and to said power-line carrier information transmission system for for exchanging information between said leased-line information transmission system and said power-line carrier information transmission system, said second exchanging means compressing or expanding said information during an exchange between said leased-line information transmission system and said power-line carrier information transmission system; and switching means responsive to information exchanged between said leased-line information transmission system and said power-line carrier information transmission system for selecting one of said first and said second exchanging means to exchange said information.

10. In an electrical load control system, a gateway as set forth in claim 9 wherein said switching means comprises detection means responsive to a switching signal included within said information for generating a switch signal and selecting means responsive to said switch signal for enabling one of said first exchanging means and said second exchanging means to operate on said information.

* * * * *